(12) United States Patent
Okada et al.

(10) Patent No.: US 12,181,663 B2
(45) Date of Patent: Dec. 31, 2024

(54) IMAGING DEVICE, ADJUSTMENT METHOD, AND ADJUSTMENT PROGRAM

(71) Applicant: FUJIFILM Corporation, Tokyo (JP)

(72) Inventors: Kazuyoshi Okada, Saitama (JP); Yasunobu Kishine, Saitama (JP); Atsushi Kawanago, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 190 days.

(21) Appl. No.: 18/153,359

(22) Filed: Jan. 12, 2023

(65) Prior Publication Data

US 2023/0204950 A1    Jun. 29, 2023

Related U.S. Application Data

(63) Continuation of application No. PCT/JP2021/027296, filed on Jul. 21, 2021.

(30) Foreign Application Priority Data

Jul. 28, 2020    (JP) .................................. 2020-127274

(51) Int. Cl.
*G02B 27/00*      (2006.01)
*G02B 5/00*       (2006.01)
(Continued)

(52) U.S. Cl.
CPC ......... *G02B 27/0081* (2013.01); *G02B 5/005* (2013.01); *G02B 7/006* (2013.01);
(Continued)

(58) Field of Classification Search
None
See application file for complete search history.

(56) References Cited

U.S. PATENT DOCUMENTS

2020/0117073 A1*    4/2020   Nakamura ............. H04N 25/48

FOREIGN PATENT DOCUMENTS

JP     2004219397     8/2004
JP     2008064933     3/2008
(Continued)

OTHER PUBLICATIONS

"Notice of Reasons for Refusal of Japan Counterpart Application", issued on Jan. 12, 2024, with English translation thereof, p. 1-p. 8.
(Continued)

*Primary Examiner* — Rodney E Fuller
(74) *Attorney, Agent, or Firm* — JCIPRNET

(57) ABSTRACT

An imaging device, an adjustment method, and an adjustment program can acquire multispectral images having good image quality. The imaging device is disposed on an image side of another optical system, and includes a multispectral camera that acquires images in a plurality of wavelength ranges, a field lens that relays the other optical system to the multispectral camera, and an adjustment mechanism that adjusts a conjugate relationship between an emission pupil position of the other optical system and an incident pupil position of the multispectral camera. The multispectral camera includes: a wavelength polarizing filter unit that includes an optical member disposed at a pupil position or near the pupil position and including a plurality of aperture regions having different centroids, a plurality of optical filters arranged in the aperture regions, and a plurality of polarizing filters arranged in the aperture regions; an imaging element; and a processor.

15 Claims, 23 Drawing Sheets

(51) Int. Cl.
  *G02B 7/00*    (2021.01)
  *G02B 7/02*    (2021.01)
  *G02B 13/00*   (2006.01)
  *H04N 23/10*   (2023.01)
  *H04N 23/63*   (2023.01)
  *H04N 23/71*   (2023.01)

(52) U.S. Cl.
  CPC ........... *G02B 7/02* (2013.01); *G02B 13/0095* (2013.01); *H04N 23/10* (2023.01); *H04N 23/633* (2023.01); *H04N 23/71* (2023.01)

(56)   References Cited

FOREIGN PATENT DOCUMENTS

| | | | | | |
|---|---|---|---|---|---|
| JP | 2008064933 | A | * | 3/2008 | |
| JP | 2019082412 | | | 5/2019 | |
| WO | WO-2021085368 | A1 | * | 5/2021 | ............. G02B 13/00 |

OTHER PUBLICATIONS

"International Search Report (Form PCT/ISA/210) of PCT/JP2021/027296", mailed on Oct. 12, 2021, with English translation thereof, pp. 1-5.

"Written Opinion of the International Searching Authority (Form PCT/ISA/237) of PCT/JP2021/027296", mailed on Oct. 12, 2021, with English translation thereof, pp. 1-8.

* cited by examiner

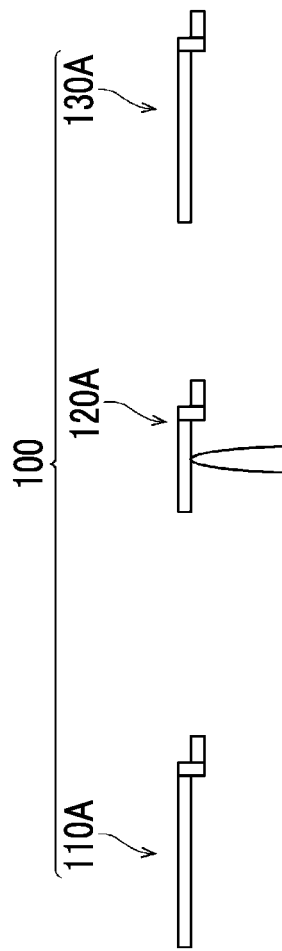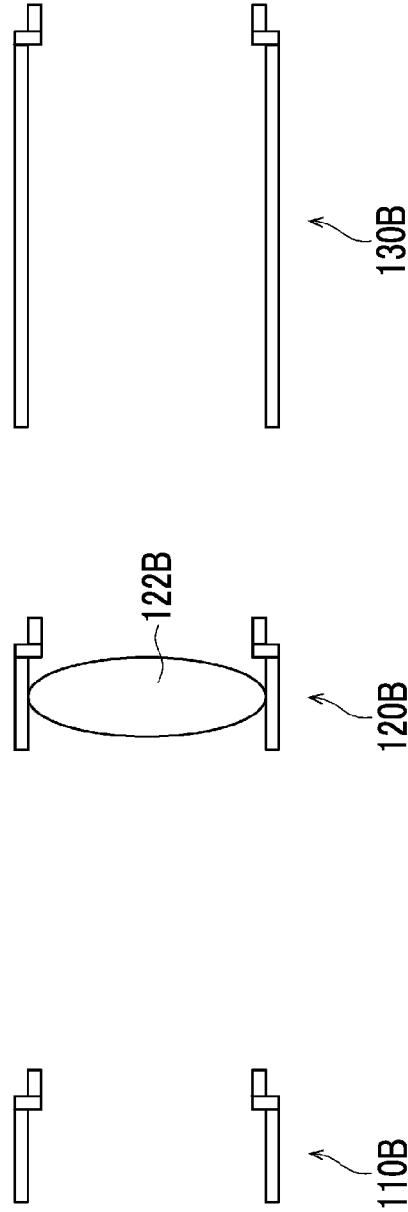

FIG. 8B
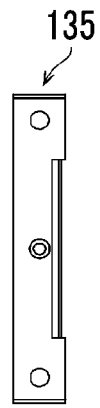
FIG. 8E
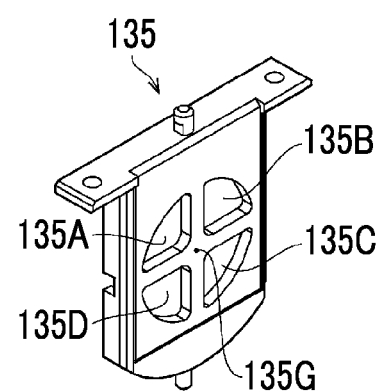
FIG. 8A  FIG. 8C  FIG. 8F
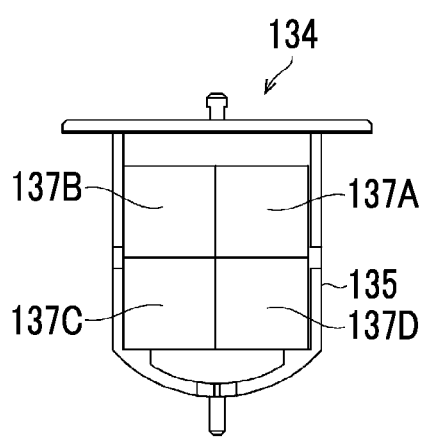 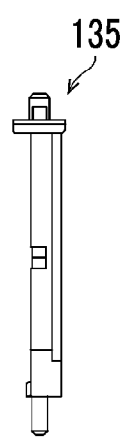 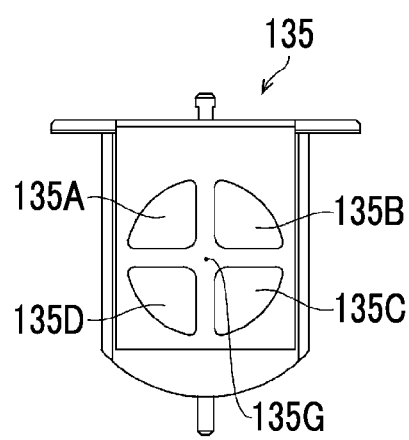
FIG. 8D
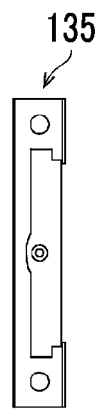

| | EXISTING OPTICAL AXIS | FIELD LENS | MULTISPECTRAL CAMERA | OTHER ELEMENTS | SITUATION ASSUMED IN EACH CASE |
|---|---|---|---|---|---|
| CASE 1 | MOVED | NOT MOVED | NOT MOVED | NOT MOVED | CASE WHERE IMAGE POSITION OF EXISTING OPTICAL SYSTEM IS CLOSE TO HOUSING OF EXISTING OPTICAL SYSTEM |
| CASE 2 | NOT MOVED | MOVED | MOVED | NOT MOVED | CASE WHERE IMAGE POSITION OF EXISTING OPTICAL SYSTEM IS CLOSE TO HOUSING OF EXISTING OPTICAL SYSTEM |
| CASE 3 | NOT MOVED | MOVED | NOT MOVED | NOT MOVED | CASE WHERE SUFFICIENT SPACE CAN BE SECURED BETWEEN EXISTING OPTICAL SYSTEM AND MULTISPECTRAL CAMERA |
| CASE 4 | NOT MOVED | NOT MOVED | MOVED | NOT MOVED | CASE WHERE OBJECT DISTANCE OF MULTISPECTRAL CAMERA IS CLOSE TO HOUSING OF MULTISPECTRAL CAMERA |
| CASE 5 | MOVED | MOVED | NOT MOVED | NOT MOVED | CASE WHERE MAGNIFICATION OF MULTISPECTRAL CAMERA IS HIGH |
| CASE 6 | NOT MOVED | NOT MOVED | NOT MOVED | MOVE FILTER UNIT | CASE WHERE USER DOES NOT WANT TO CHANGE IMAGE MAGNIFICATION |
| CASE 7 | NOT MOVED | NOT MOVED | NOT MOVED | CHANGE FOCAL LENGTH OF FIELD LENS | CASE WHERE USER DOES NOT WANT TO CHANGE IMAGE MAGNIFICATION |

FIG. 19

| | | CASE WHERE CENTROIDS OF APERTURE REGIONS ARE DIFFERENT FROM EACH OTHER | CASE WHERE CENTROIDS OF APERTURE REGIONS COINCIDE WITH EACH OTHER (CONCENTRIC CIRCULAR SHAPES) |
|---|---|---|---|
| PARAMETERS RELATED TO MOVEMENT OF FIELD LENS | REDUCTION IN AMOUNT OF LIGHT AT PERIPHERAL PORTION | SIGNIFICANT | NOT SIGNIFICANT |
| | LENGTH OF MOVING DISTANCE REQUIRED FOR IMPROVEMENT OF AMOUNT OF LIGHT AT PERIPHERAL PORTION | LONG | SHORT |
| | DETERMINATION OF MOVING DIRECTION REQUIRED FOR IMPROVEMENT OF AMOUNT OF LIGHT AT PERIPHERAL PORTION | EASY | DIFFICULT |
| PARAMETERS RELATED TO ATTACHABILITY AND DETACHABILITY | SELECTION OF FIELD LENS | DIFFICULT (RANGE OF FOCAL LENGTH OF SUITABLE FIELD LENS IS NARROW) | EASY (RANGE OF FOCAL LENGTH OF SUITABLE FIELD LENS IS WIDE) |
| | DETERMINATION OF DIRECTION OF CHANGE IN FOCAL LENGTH OF FIELD LENS (LONG AND SHORT) | EASY | DIFFICULT |
| OTHERS | RANGE OF APPLICABLE F-NUMBER | WIDE (※ IN CASE WHERE FILED LENS IS APPROPRIATELY ADJUSTED, LIMITATION CAUSED BY F-NUMBER IS SMALL) | NARROW (※ IN CASE WHERE F-NUMBER IS LARGE IN CASE OF RING SPLIT TYPE, LIGHT DOES NOT PASS THROUGH OUTER PERIPHERAL PORTION OF FILTER AND IMAGE DOES NOT APPEAR. THIS CANNOT BE SOLVED BY ADJUSTMENT OF FIELD LENS.) |

FIG. 20A
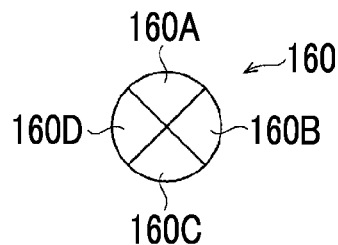
FIG. 20B1
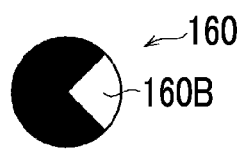
FIG. 20C1
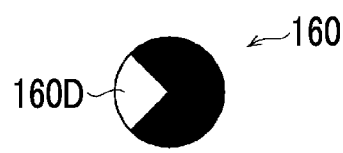
FIG. 20B2
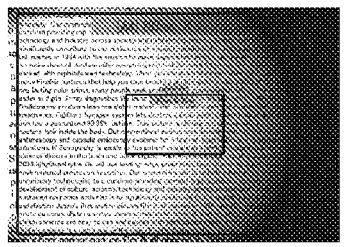
FIG. 20C2
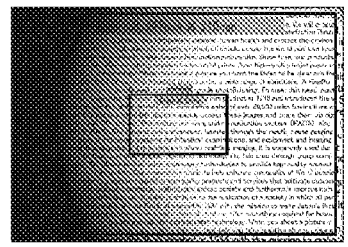
FIG. 20B3
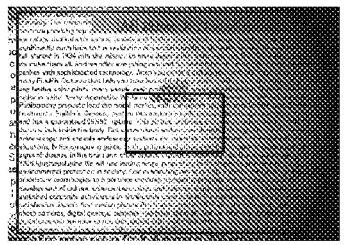
FIG. 20C3
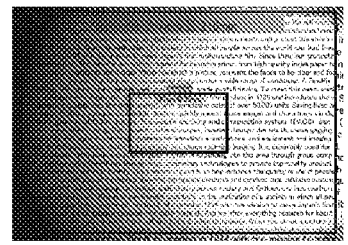
FIG. 20B4
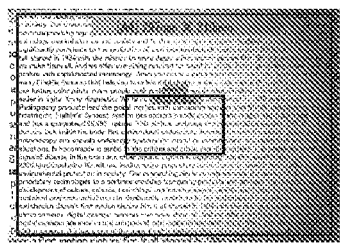
FIG. 20C4
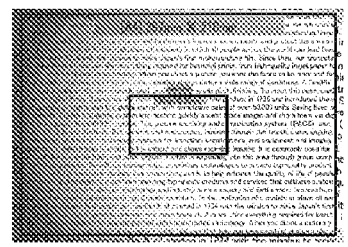

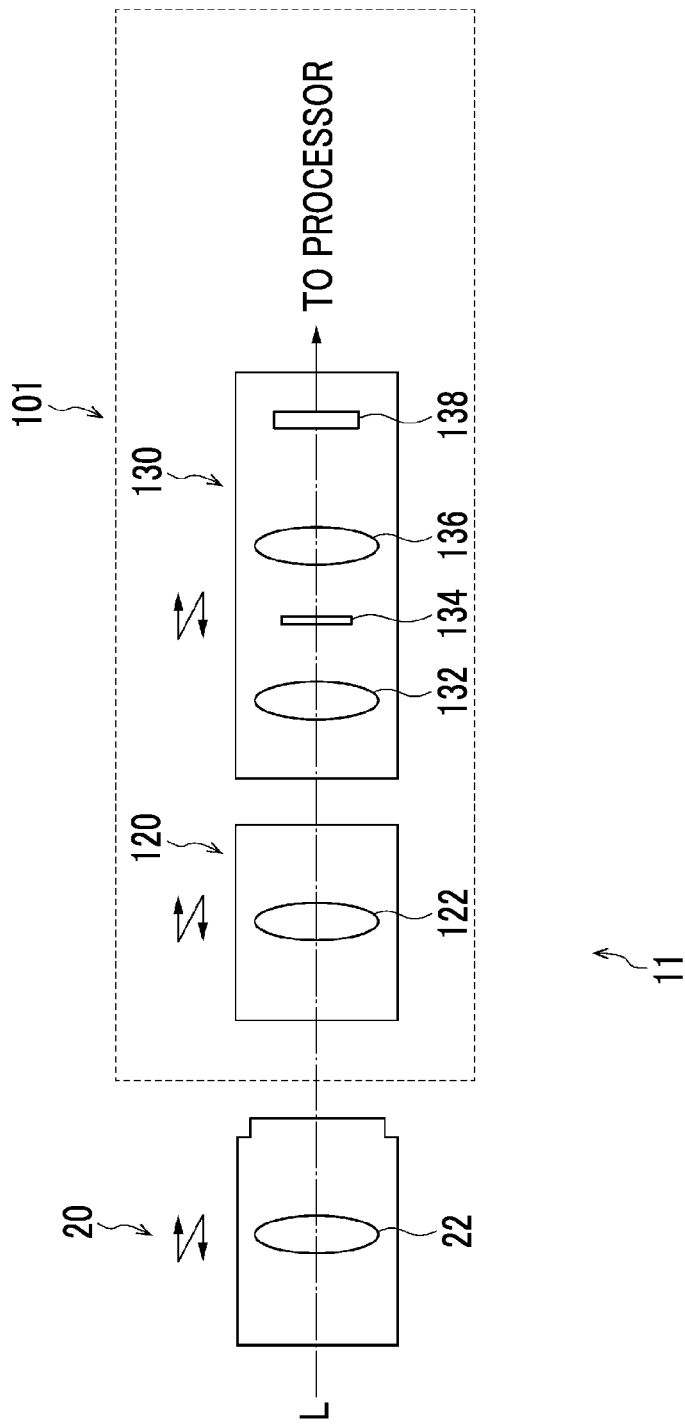

IMAGING DEVICE, ADJUSTMENT METHOD, AND ADJUSTMENT PROGRAM

CROSS-REFERENCE TO RELATED APPLICATIONS

The present application is a Continuation of PCT International Application No. PCT/JP2021/027296 filed on Jul. 21, 2021 claiming priority under 35 U.S.C § 119(a) to Japanese Patent Application No. 2020-127274 filed on Jul. 28, 2020. Each of the above applications is hereby expressly incorporated by reference, in its entirety, into the present application.

BACKGROUND OF THE INVENTION

1. Field of the Invention

The present invention relates to an imaging device that captures multispectral images, and an adjustment method and an adjustment program for the imaging device.

2. Description of the Related Art

With regard to a technique for capturing multispectral images, for example, JP2019-082412A discloses an imaging device that comprises a spectral filter array and a field lens.

SUMMARY OF THE INVENTION

One embodiment of a technique of the present disclosure provides an imaging device, an adjustment method, and an adjustment program that can acquire multispectral images having good image quality.

An imaging device according to a first aspect of the present invention is disposed on an image side of another optical system, and comprises a multispectral camera that acquires images in a plurality of wavelength ranges, a field lens that relays the other optical system to the multispectral camera, and an adjustment mechanism that adjusts a conjugate relationship between an emission pupil position of the other optical system and an incident pupil position of the multispectral camera. The multispectral camera includes: a wavelength polarizing filter unit including a frame which is disposed at a pupil position or near the pupil position and includes a plurality of aperture regions and in which centroids of the plurality of aperture regions are different from each other, a plurality of optical filters that are arranged in the plurality of aperture regions and include two or more optical filters transmitting lights having at least a part of wavelength ranges different from each other, and a plurality of polarizing filters that are arranged in the plurality of aperture regions and have different polarization directions; an imaging element that includes a plurality of pixel groups receiving light transmitted through any of the plurality of aperture regions; and a processor that generates an image on the basis of a plurality of image signals output from the imaging element.

According to a second aspect, in the imaging device according to the first aspect, the adjustment mechanism adjusts a distance between the other optical system and the field lens.

According to a third aspect, in the imaging device according to the first aspect, the adjustment mechanism adjusts a distance between the field lens and the multispectral camera.

According to a fourth aspect, in the imaging device according to any one of the first to third aspects, the adjustment mechanism adjusts a distance between the emission pupil position of the other optical system and the field lens and a distance between the field lens and the incident pupil position of the multispectral camera.

According to a fifth aspect, in the imaging device according to any one of the first to fourth aspects, the adjustment mechanism keeps an image magnification constant to make the adjustment.

According to a sixth aspect, in the imaging device according to the fifth aspect, the adjustment mechanism changes a position of the wavelength polarizing filter unit and/or a focal length of the field lens to keep the image magnification constant.

According to a seventh aspect, in the imaging device according to any one of the first to sixth aspects, the adjustment mechanism is an attachment and detachment mechanism for the wavelength polarizing filter unit.

According to an eighth aspect, in the imaging device according to any one of the first to seventh aspects, the processor outputs image support information required for the adjustment.

According to a ninth aspect, the imaging device according to the eighth aspect further comprises a display device and the processor outputs the image support information based on light and darkness information of at least one spectral image obtained from the multispectral camera.

According to a tenth aspect, in the imaging device according to the ninth aspect, the processor outputs a procedure of the adjustment serving as the image support information on the basis of a direction of the aperture region and the light and darkness information.

According to an eleventh aspect, the imaging device according to any one of the eighth to tenth aspects further comprises a display device and the display device displays at least one of the image support information output from the processor or a procedure of the adjustment serving as the image support information.

An adjustment method according to a twelfth aspect of the present invention is an adjustment method for an imaging device that is disposed on an image side of another optical system. The imaging device includes: a multispectral camera that includes a frame, a plurality of optical filters, and a plurality of polarizing filters and acquires images in a plurality of wavelength ranges, the frame disposed at a pupil position or near the pupil position and including a plurality of aperture regions, centroids of the plurality of aperture regions being different from each other, the plurality of optical filters being arranged in the plurality of aperture regions and including two or more optical filters transmitting lights having at least a part of wavelength ranges different from each other, and a plurality of polarizing filters being arranged in the plurality of aperture regions and having different polarization directions; a field lens that relays the other optical system to the multispectral camera; and an adjustment mechanism that adjusts a conjugate relationship between an emission pupil position of the other optical system and an incident pupil position of the multispectral camera. The adjustment method comprises an output step of outputting image support information required for the adjustment.

According to a thirteenth aspect, in the adjustment method according to the twelfth aspect, in the output step, the image support information based on light and darkness information of at least one spectral image obtained from the multispectral camera is displayed on a display device.

According to a fourteenth aspect, in the adjustment method according to the thirteenth aspect, in the output step, a procedure of the adjustment serving as the image support information is displayed on the display device on the basis of a direction of the aperture region and the light and darkness information.

An adjustment program according to a fifteenth aspect of the present invention causes a computer to perform the adjustment method according to any one of the twelfth to fourteenth aspects.

BRIEF DESCRIPTION OF THE DRAWINGS

FIGS. 3A, 3B, 3C, and 3D are conceptual diagrams showing aspects of the adjustment of a conjugate relationship depending on the exchange or the like of each element.

FIGS. 8A, 8B, 8C, 8D, 8E, and 8F are diagrams showing the configuration of a frame.

FIG. 13 is a table showing an example of a relationship between the relative position and the like of the field lens and elements to be adjusted.

FIG. 19 is a table showing an influence of the shapes of aperture regions on the adjustment of a conjugate relationship.

FIGS. 20A, 20B1, 20B2, 20B3, 20B4, 20C1, 20C2, 20C3, and 20C4 are diagrams showing specific examples of the adjustment of a conjugate relationship in which the shapes of aperture regions are considered.

FIG. 23 is a diagram showing a system configuration in a case where elements are not connected to each other.

DESCRIPTION OF THE PREFERRED EMBODIMENTS

Application of Multispectral Camera to Another Optical System

In a case where a multispectral camera capable of capturing images in a plurality of wavelength ranges is used in combination with another optical system, images can be captured in the plurality of wavelength ranges even in an optical system not having a multispectral imaging function. However, in a case where the multispectral camera is relayed to another optical system and a conjugate relationship of pupils is not appropriately adjusted, there is a concern that the amount of light will be reduced in a peripheral region or the like in an imaging angle of view (there is a concern that so-called "vignetting" will occur). In order to solve this problem, a field lens is inserted into a general relay optical system to improve a conjugate relationship of pupils.

Various configurations can be considered for the multispectral camera, but it is necessary to more strictly satisfy a conjugate relationship of pupils in the case of a pupil split type. Further, a field lens, which is used to relay to a specific optical system, may not be used for other optical systems. However, such a problem has not been considered in the related art.

Under such circumstances, the inventors of the present invention have conceived an imaging device, an adjustment method, and an adjustment program that can acquire multispectral images having good image quality. Some embodiments of the present invention will be described below with reference to the accompanying drawings.

First Embodiment

<Configuration of Imaging System>

Figure 1:
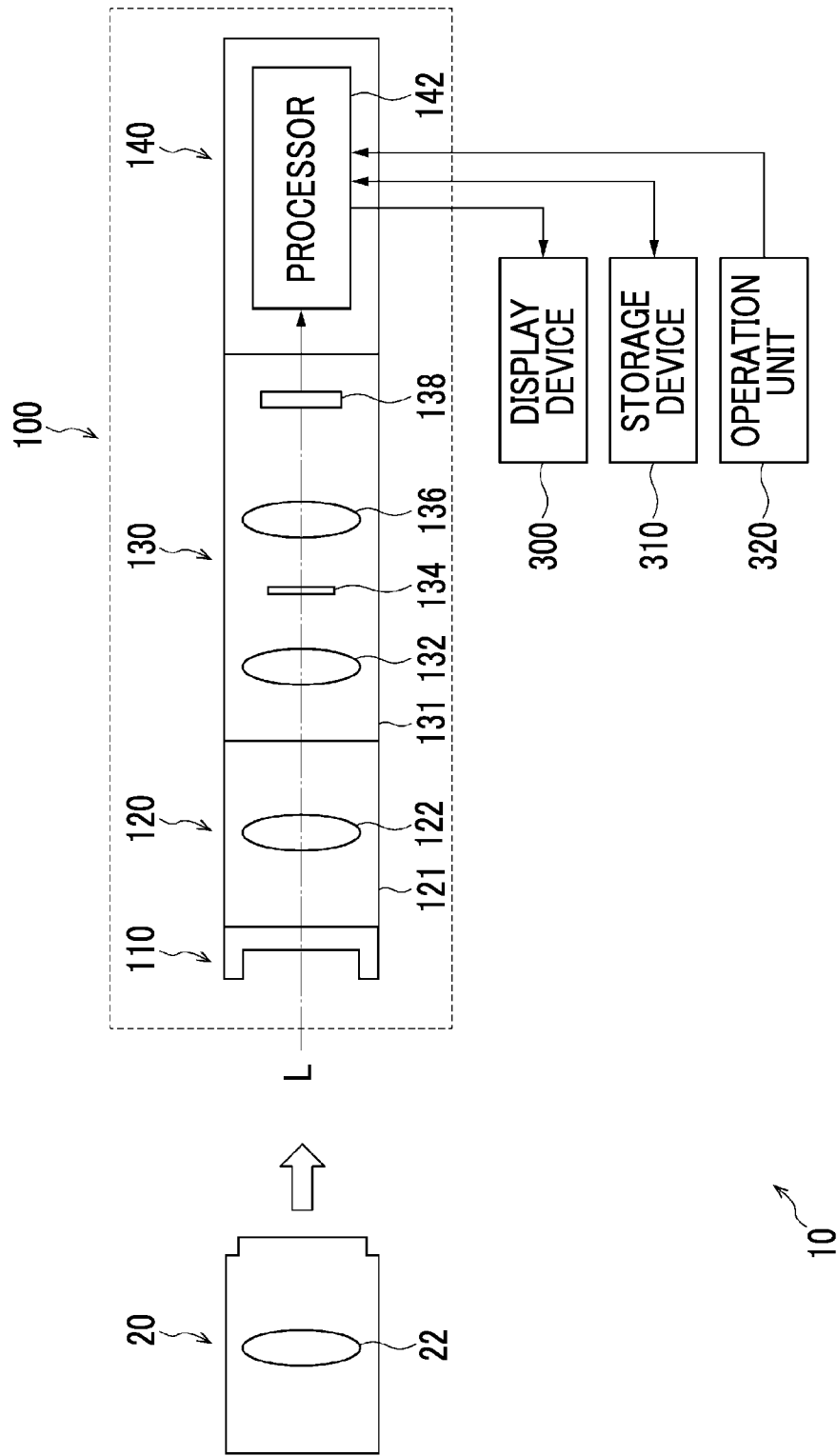
FIG. 1 is a diagram showing a configuration of an imaging system according to a first embodiment.

FIG. 1 is a diagram showing a configuration of an imaging system 10 (an imaging system, an imaging device) according to a first embodiment. The imaging system 10 includes an optical system 20 (another optical system; including a lens 22), an imaging device 100, a display device 300 (a display device, such as a liquid crystal display), a storage device 310 (a magneto-optical recording device, a semiconductor memory, or the like), and an operation unit 320 (a keyboard, a mouse, switches, or the like); and the imaging device 100 is disposed on an image side of the optical system 20. A speaker that outputs image support information to be described later as a voice may be provided. An example of the optical system 20 will be described later (see FIGS. 21 and 22).

<Configuration of Imaging Device>

Figure 2:
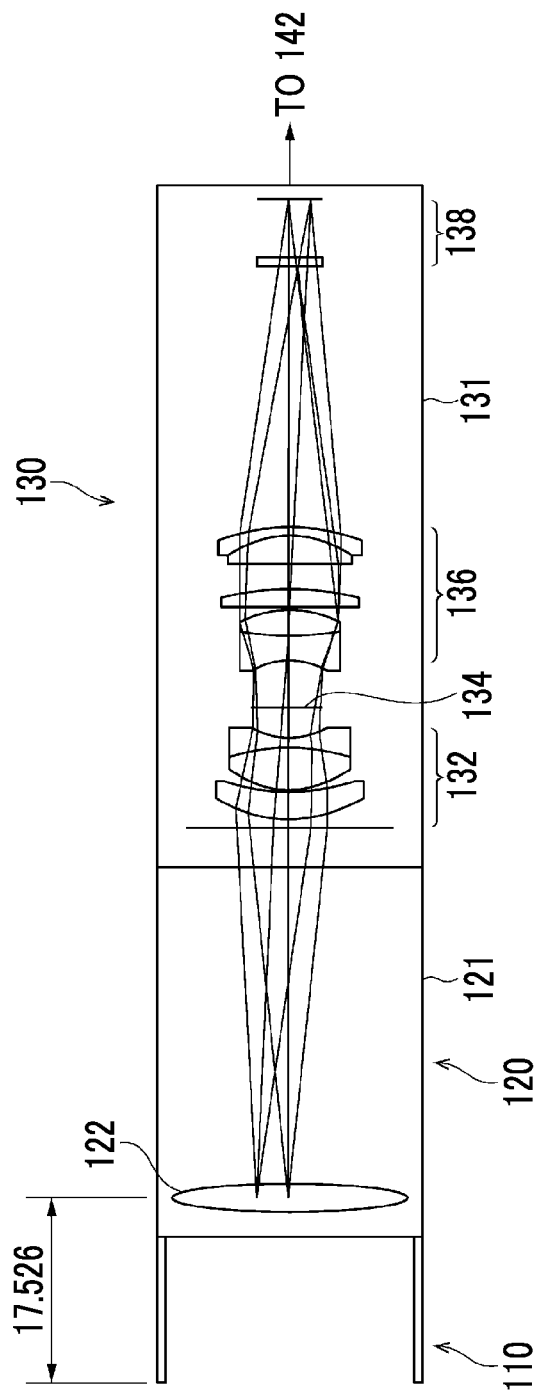
FIG. 2 is a diagram showing a configuration of an imaging device.

FIG. 2 is a diagram showing a configuration of the imaging device 100 (imaging device). As shown in FIGS. 1 and 2, the imaging device 100 comprises a mount adapter 110 (adjustment mechanism), a field lens unit 120 (field lens), a multispectral camera 130 (multispectral camera), and an imaging device body 140 (multispectral camera). A field lens 122 is a lens that relays the optical system 20 to the multispectral camera 130.

These elements can be attached to and detached from each other by a screw mount or a bayonet mount (each of these mounts is an aspect of the adjustment mechanism). Standards for a screw mount include, for example, a C mount and a CS mount. The C mount has a diameter of 25.4 mm, a screw pitch of 0.794 mm, and a flange back of 17.526 mm (see FIG. 2).

<Outline of Adjustment of Conjugate Relationship>

In the first embodiment, the adjustment of a conjugate relationship is to conjugate an emission pupil position of the optical system 20 (another optical system) to an incident pupil position of the imaging device 100 (imaging device), and a user adjusts a conjugate relationship using the attachment and detachment of elements having different sizes and different characteristics, the movement of the lens, or the like (an adjustment made by the adjustment mechanism). Accordingly, it is possible to prevent a reduction in the amount of light at a peripheral portion of a spectral image (vignetting).

The adjustment of a conjugate relationship can be made on the basis of the light and darkness information of spectral images. Specifically, as described in detail later, a processor 142 calculates light and darkness information of at least one spectral image obtained from the multispectral camera 130 (light amount distribution in an image), and generates and outputs information (image support information) required for the adjustment of a conjugate relationship on the basis of the light and darkness information. A user can adjust a conjugate relationship by performing the attachment and detachment, exchange, movement, or the like of components according to this image support information.

FIGS. 3A, 3B, 3C, and 3D are conceptual diagrams showing aspects of the adjustment of a conjugate relationship depending on the exchange or the like of each element. As shown in FIG. 3A, the imaging device 100 can include a mount adapter 110A (adjustment mechanism), a field lens unit 120A including a field lens 122A, and a multispectral camera 130A (a lens and an imaging device body are not shown). In a case where a mount adapter 110B (adjustment mechanism) different from the mount adapter 110A in terms of a size (a length in a direction of an optical axis) is mounted as shown in FIG. 3B in this case, a distance between the optical system 20 and the imaging device 100 can be adjusted to adjust a conjugate relationship.

Further, in a case where a field lens unit 120B including a field lens 122B (adjustment mechanism) different from the field lens 122A (adjustment mechanism) in terms of a focal length and/or an image magnification is attached/detached as shown in FIG. 3C, a distance between the optical system 20 and the field lens can also be adjusted to adjust a conjugate relationship. In a case where an adjustment is to be made by the field lens unit, the lens may be moved forward or backward in a state where a unit having a specific configuration is mounted to change a focal length and/or an image magnification.

FIG. 3D shows an aspect of an adjustment made by a multispectral camera, and a conjugate relationship can be adjusted in a case where a multispectral camera 130B including a lens different from a lens of the multispectral camera 130A in terms of a focal length and/or an image magnification is mounted. Further, even in a case where an adjustment is to be made by the multispectral camera, a lens may be moved forward or backward in a state where a camera having a specific configuration is mounted to change a focal length and/or an image magnification.

Only any one of adjustments to be made by the mount adapter, the field lens unit, and the multispectral camera may be performed, or a plurality of the adjustments may be performed in combination. For example, in a case where the mount adapter and the field lens unit are exchanged, a distance between the emission pupil position of the optical system 20 (another optical system) and a field lens and a distance between the field lens and an incident pupil position of the multispectral camera can be adjusted.

<Adjustment of Conjugate Relationship in Field Lens Unit>

As shown in FIGS. 1 and 2, the field lens unit 120 includes a lens barrel 121 and the field lens 122 (field lens). The field lens 122 is moved forward or backward in a direction of an optical axis L in a case where a user operates the adjustment mechanism to be described later. The field lens 122 may be composed of one lens or may be composed of a plurality of lenses.

Figure 4A:
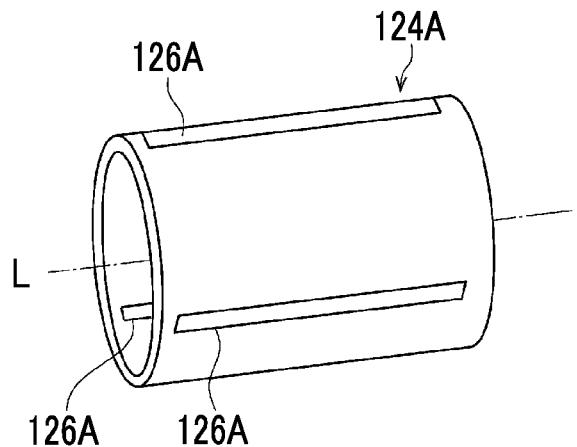
FIGS. 4A, 4B, and 4C are diagrams showing an example of an adjustment mechanism for a field lens.
Figure 4B:
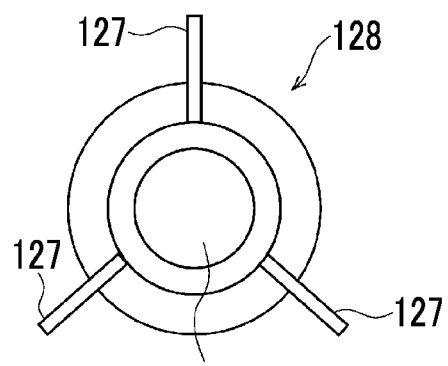
Figure 4C:
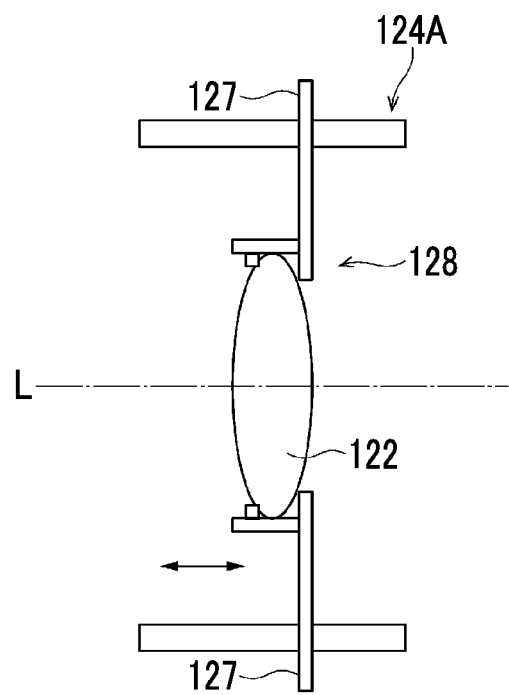

FIGS. 4A, 4B, and 4C are diagrams showing an example of an adjustment mechanism for the field lens. FIG. 4A is a perspective view of a lens barrel 124A, and three slits 126A are formed in the lens barrel 124A in a direction parallel to the optical axis L. FIG. 4B is a front view of a lens unit 128, and the field lens 122 and three arms 127 are shown in FIG. 4B. FIG. 4C shows a state where the arms 127 are inserted into the slits 126A so that the lens unit 128 is mounted on the lens barrel 124A. The arms 127 can be moved in the slits 126A in the direction of the optical axis L in the state shown in FIG. 4C, so that a user can adjust a conjugate relationship by moving the field lens 122 forward or backward. In a case where the field lens 122 is composed of a plurality of lenses, such adjustment mechanisms may be provided for some of the plurality of lenses or the adjustment mechanisms may be provided for all the plurality of lenses.

Figure 5A:
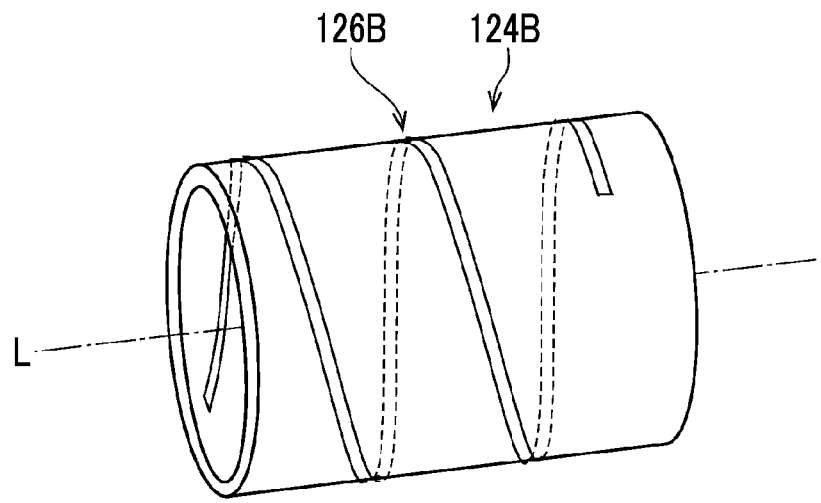
FIGS. 5A and 5B are diagrams showing another example of the adjustment mechanism for the field lens.
Figure 5B:
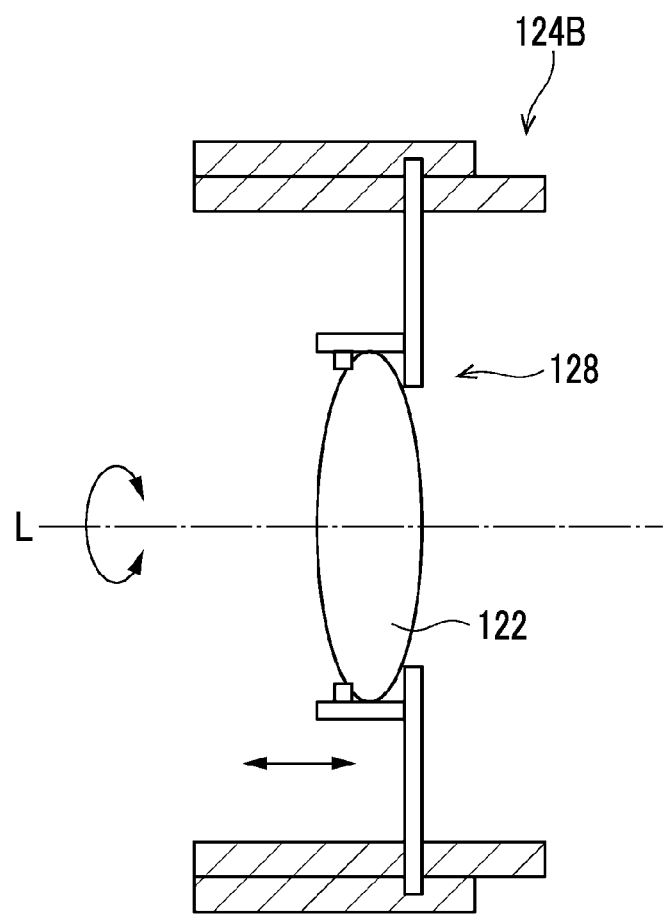

FIGS. 5A and 5B are diagrams showing another example of the adjustment mechanism for the field lens. FIG. 5A is a perspective view of a lens barrel 124B, and a helical slit 126B about the optical axis L is formed in the lens barrel 124B. FIG. 5B shows a state where the same lens unit 128 as the lens unit shown in FIGS. 4B and 4C is mounted on the lens barrel 124B (a state where the arms 127 are inserted into the slit 126B). The lens unit 128 can be moved forward or backward while being rotated about the optical axis L in the state shown in FIG. 5B, so that a user can move the field lens 122 forward or backward.

In the field lens unit 120, a distance between the field lens 122 and the optical system 20 (another optical system) and/or the multispectral camera 130 can be changed by the adjustment mechanism shown in FIGS. 4A, 4B, and 4C or FIGS. 5A and 5B. Further, the field lens 122 may be moved forward or backward to change a focal length so that an image magnification is kept constant.

<Adjustment of Conjugate Relationship in Multispectral Camera>

Figure 6:
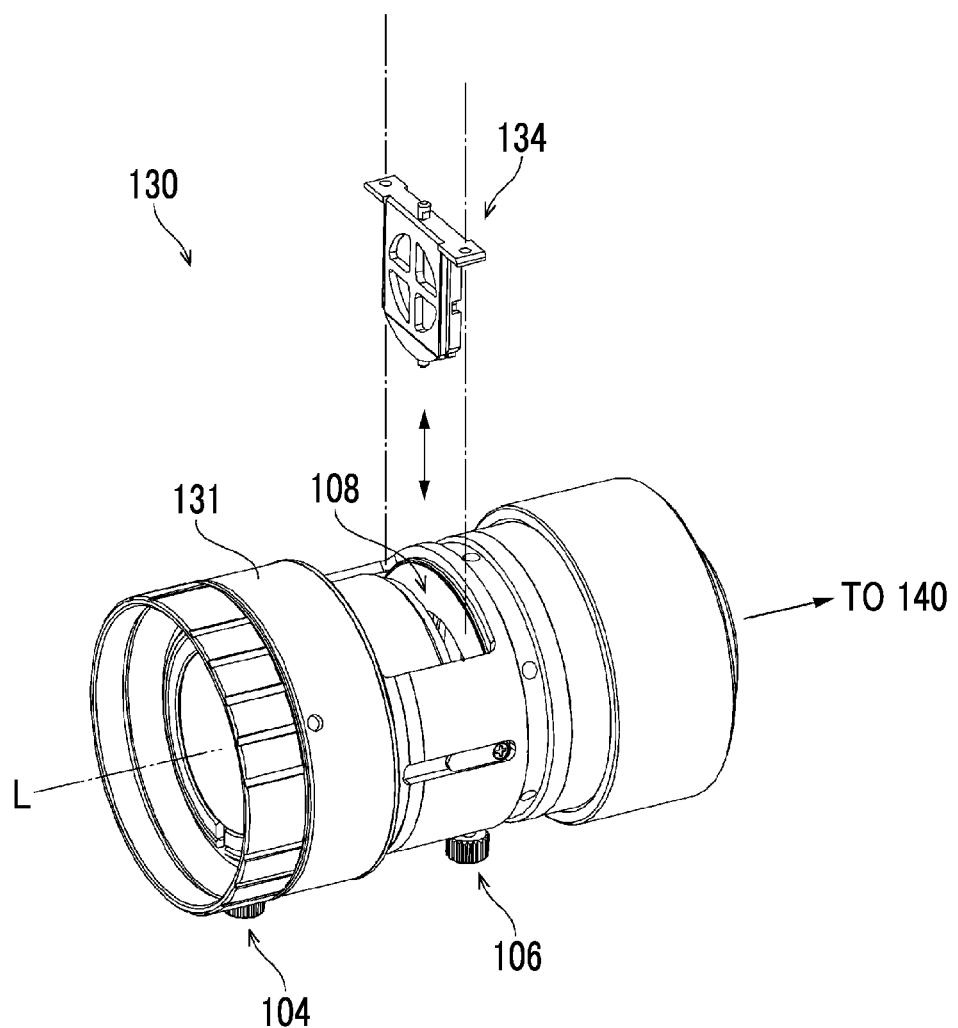
FIG. 6 is a perspective view of a multispectral camera.
Figure 7:
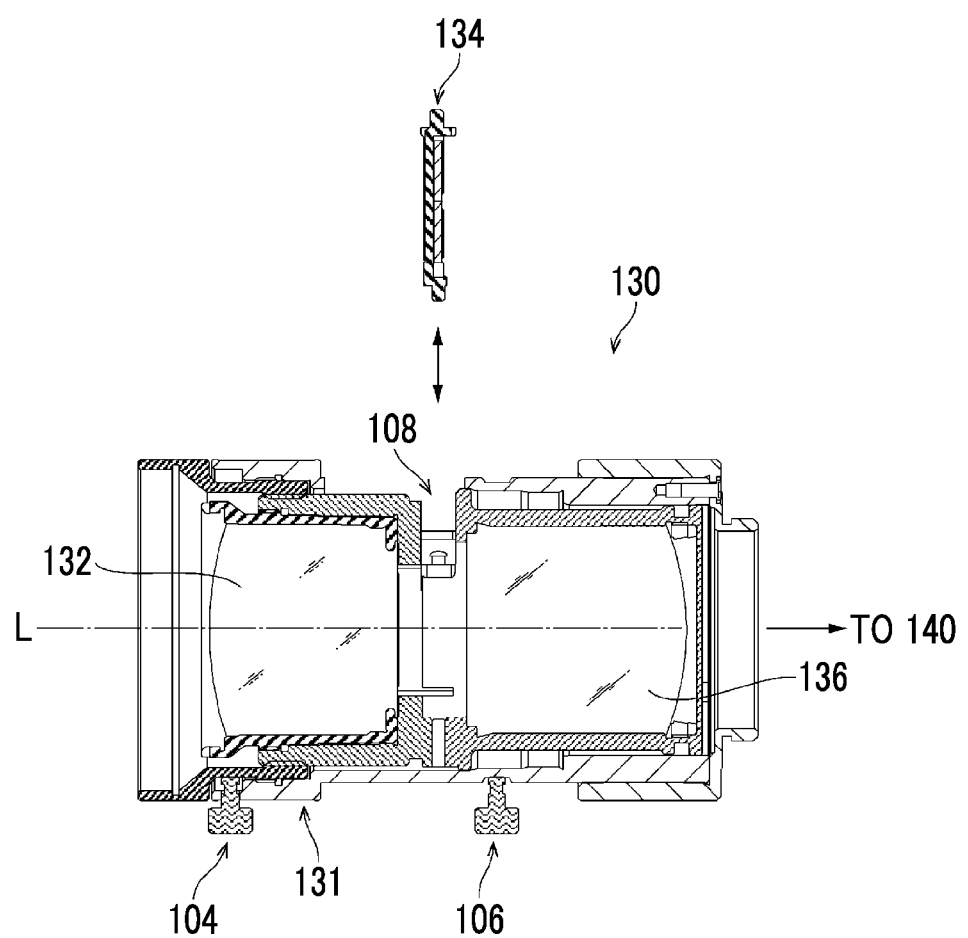
FIG. 7 is a cross-sectional view of the multispectral camera.

FIGS. 6 and 7 are a perspective view and a cross-sectional view of the multispectral camera 130, respectively. As shown in FIGS. 6 and 7, an optical system including a first lens 132 and a second lens 136 is disposed in a lens barrel 131 of the multispectral camera 130 and these lenses are moved forward or backward in the direction of the optical axis L in a case where a first lever 104 and a second lever 106 are rotationally moved, so that a focal length and/or an image magnification is adjusted. Each of the first lens 132 and the second lens 136 may be a lens group composed of a plurality of lenses. The same mechanism (the lens barrel, the arms, the slits, and the like) as that in the case of the field lens unit can be used for the forward or backward movement of the first lens 132 and the second lens 136 (see FIGS. 4A, 4B, and 4C and FIGS. 5A and 5B). That is, these mechanisms form the adjustment mechanism.

Further, a slit 108 (an attachment and detachment mechanism for a wavelength polarizing filter unit) is formed in the lens barrel 131 at a pupil position of the imaging device 100 or near the pupil position, and a wavelength polarizing filter unit 134 (wavelength polarizing filter unit) is inserted into the slit 108 and is disposed in a state where an optical axis of the wavelength polarizing filter unit 134 coincides with the optical axis L of the imaging optical system (the first lens 132 and the second lens 136).

<Configuration of Wavelength Polarizing Filter Unit>

Figure 9:
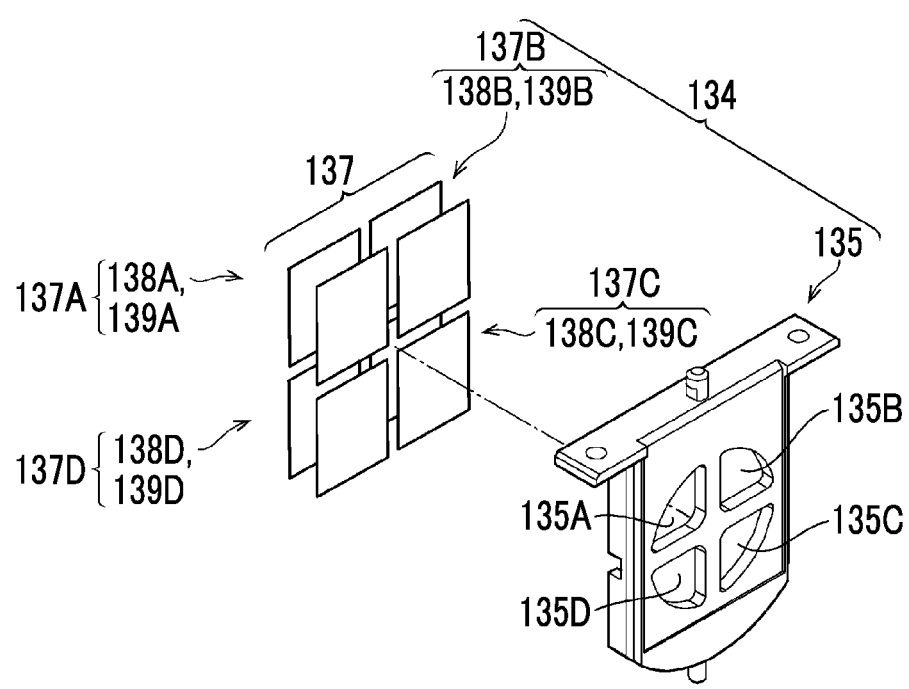
FIG. 9 is a diagram showing a configuration of a wavelength polarizing filter unit.
Figure 10A:
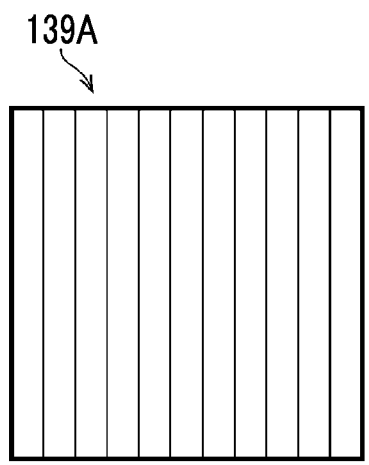
FIGS. 10A, 10B, 10C, and 10D are diagrams showing polarization directions of polarizing filters.
Figure 10B:
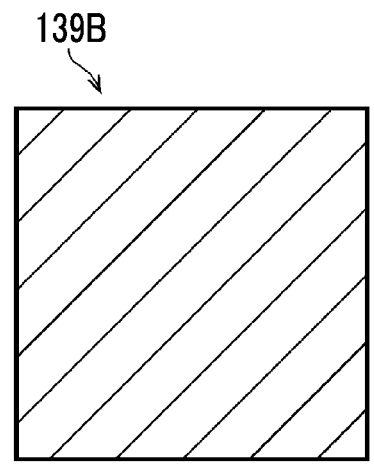
Figure 10C:
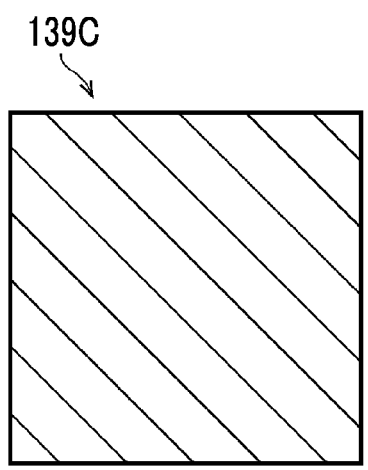
Figure 10D:
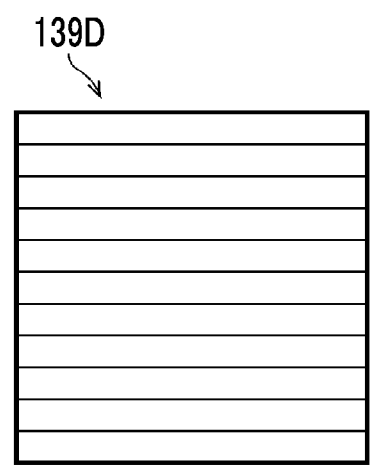

FIGS. 8A, 8B, 8C, 8D, 8E, and 8F are diagrams showing a configuration of a frame 135, and FIG. 9 is a diagram showing a configuration of the wavelength polarizing filter unit 134. Specifically, FIGS. 8A to 8F are a rear view, a top view, a left side view, a bottom view, a perspective view, and a front view of the frame 135 and/or the wavelength polarizing filter unit 134, respectively. As shown in FIGS. 8E and 8F, the frame 135 comprises four aperture regions 135A to 135D (a plurality of aperture regions). The centroids of these aperture regions 135A to 135D are different from each other and are also different from a centroid 135G of all the aperture regions. The shape of each of the aperture regions 135A to 135D is not limited to a fan shape shown in FIGS. 8E, 8F, and 9, and may be another shape, such as a circular shape, a rectangular shape, or a polygonal shape. Further, the shapes and sizes of the aperture regions may be different from each other. As shown in FIGS. 8A and 9, filter sets 137A to 137D (a plurality of optical filters and a plurality of polarizing filters) are disposed in these aperture regions (on the back side of the frame 135), respectively. The filter sets 137A to 137D may be fixed using an adhesive.

The filter set 137A has a configuration in which an optical filter 138A and a polarizing filter 139A are superimposed as shown in FIG. 9. Further, the filter set 137B has a configuration in which an optical filter 138B and a polarizing filter 139B are superimposed. Furthermore, the filter set 137C has a configuration in which an optical filter 138C and a polarizing filter 139C are superimposed. Likewise, the filter set 137D comprises an optical filter 138D and a polarizing filter 139D. These filter sets 137A to 137D are mounted on the frame 135.

The optical filters 138A to 138D are a plurality of optical filters (color filters) including two or more optical filters that transmit lights having at least a part of wavelength ranges different from each other, and the polarizing filters 139A to 139D are a plurality of polarizing filters having different polarization directions. FIGS. 10A, 10B, 10C, and 10D are diagrams showing examples of the polarization directions of the polarizing filters, and the polarization directions of the polarizing filters 139A to 139D can be set to four directions (of which the number is equal to the number of the aperture regions; for example, 0°, 45°, 90°, and 135°) at most as illustrated in FIGS. 10A to 10D. Each of the polarizing filters 139A to 139D may be a filter that polarizes light using a polarizing film or may be a filter that polarizes light using wire grids or a plurality of slits.

The wavelength polarizing filter unit 134 having the above-mentioned configuration can be inserted into and removed from the slit 108, so that an attachment and detachment mechanism for the wavelength polarizing filter unit 134 is formed. A user can select and use a wavelength polarizing filter unit having a desired wavelength range or a wavelength polarizing filter unit having a small reduction in the amount of light at a peripheral portion (vignetting). The wavelength polarizing filter unit may be adapted to be capable of being moved forward or backward in the direction of the optical axis L by the mechanism (adjustment mechanism) described above with reference to FIGS. 4A, 4B, and 4C or FIGS. 5A and 5B. Accordingly, it is possible to adjust a conjugate relationship without changing an image magnification (see Case 6 of FIG. 13).

The number of aperture regions may be three or less, and three or less types of optical filters (color filters) and polarizing filters may be provided to correspond to the aperture regions. In this case, one or more of the aperture regions 135A to 135D may be shielded by a shielding member or the like.

<Configuration of Imaging Element>

Figure 11:
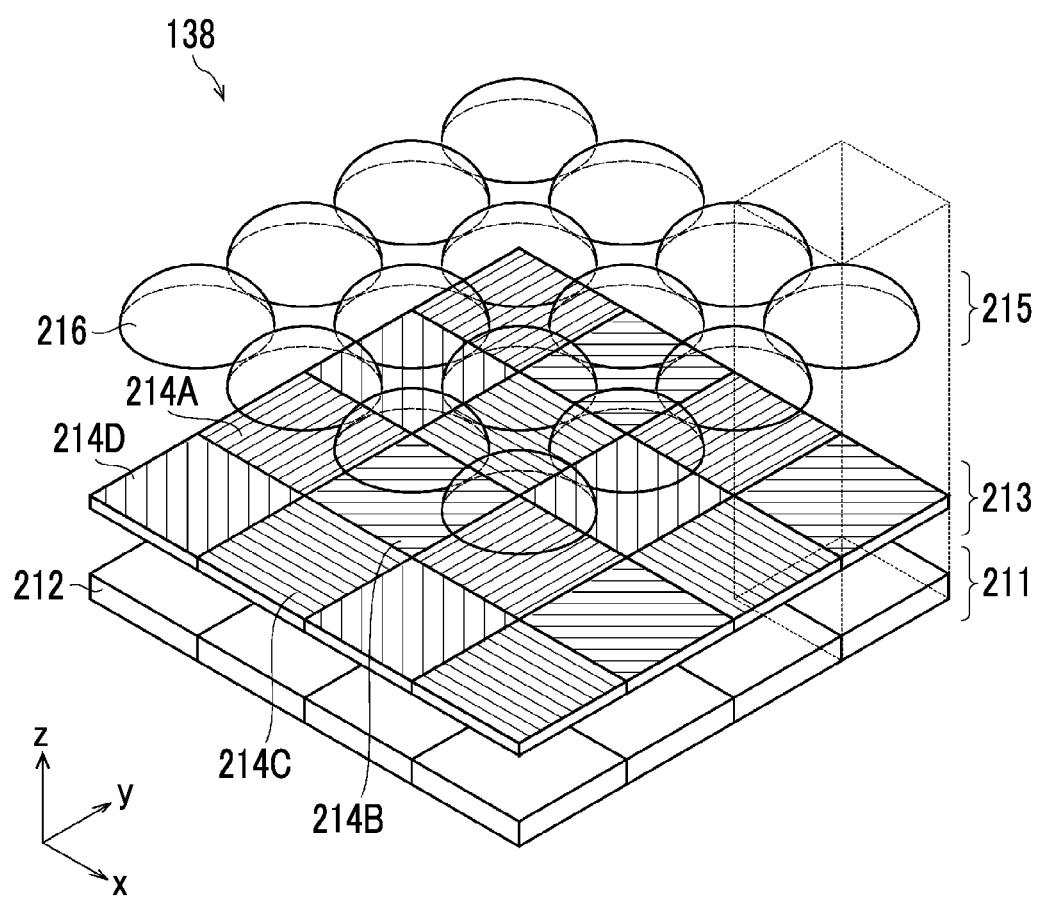
FIG. 11 is a diagram showing a configuration of an imaging element.

FIG. 11 is a diagram showing the configuration of an imaging element 138. The imaging element 138 is a complementary metal-oxide semiconductor (CMOS) type imaging element (image sensor), and is a monochrome imaging element that includes a pixel array layer 211, a polarizing filter element-array layer 213, and a microlens array layer 215. The respective layers are arranged in order of the pixel array layer 211, the polarizing filter element-array layer 213 (a plurality of polarizing elements), and the microlens array layer 215 from an image plane side toward an object side. The imaging element 138 is not limited to a CMOS type image sensor and may be an XY address type image sensor or a charge coupled device (CCD) type image sensor.

The pixel array layer 211 has a configuration in which a lot of photodiodes 212 (a plurality of pixel groups) are two-dimensionally arranged. One photodiode 212 forms one pixel. The respective photodiodes 212 are regularly arranged in a horizontal direction (x direction) and a vertical direction (y direction).

The polarizing filter element-array layer 213 has a configuration in which four types of polarizing filter elements 214A, 214B, 214C, and 214D (a plurality of polarizing elements) having different polarization directions (the polarization directions of light to be transmitted) are two-dimensionally arranged. The polarization directions of the polarizing filter elements 214A, 214B, 214C, and 214D can be set to, for example, 0°, 45°, 90°, and 135°. Further, these polarization directions can be made to correspond to the polarization directions of the polarizing filters 139A to 139D of the above-mentioned wavelength polarizing filter unit 134 (see FIGS. 10A, 10B, 10C, and 10D). Due to these polarizing filter elements 214A to 214D, the imaging element 138 includes a plurality of pixel groups that receive any of pieces of light transmitted through the plurality of aperture regions. These polarizing filter elements 214A and 214B are arranged at the same intervals as the photodiodes 212, and are provided for pixels, respectively.

The microlens array layer 215 comprises microlenses 216 that are arranged for the respective pixels.

The imaging element 138 comprises an analog amplifier, an analog-to-digital (A/D) converter, and an imaging element driver (not shown).

<Configuration of Processor>

Figure 12:
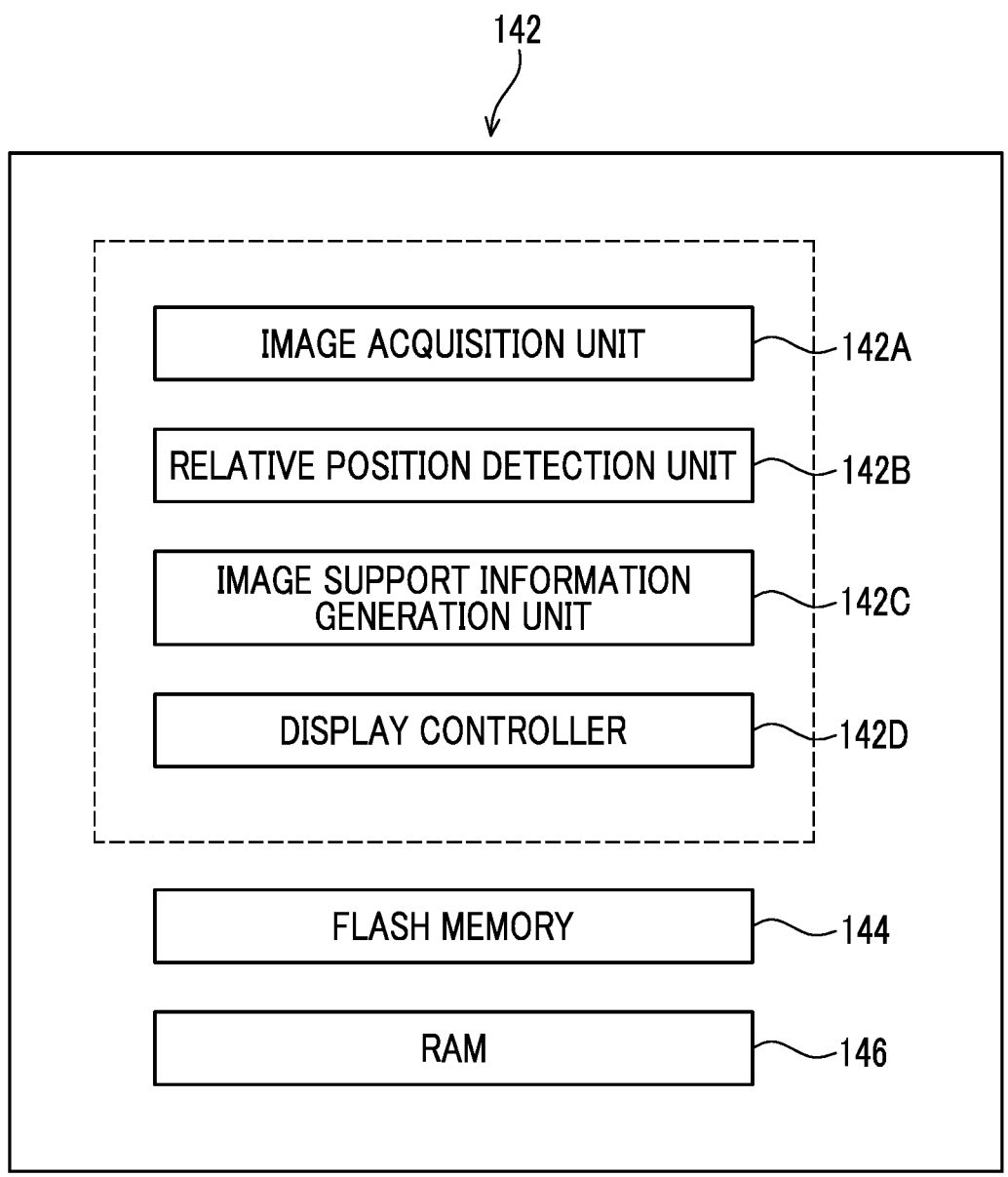
FIG. 12 is a diagram showing a configuration of a processor.
Figure 14A:
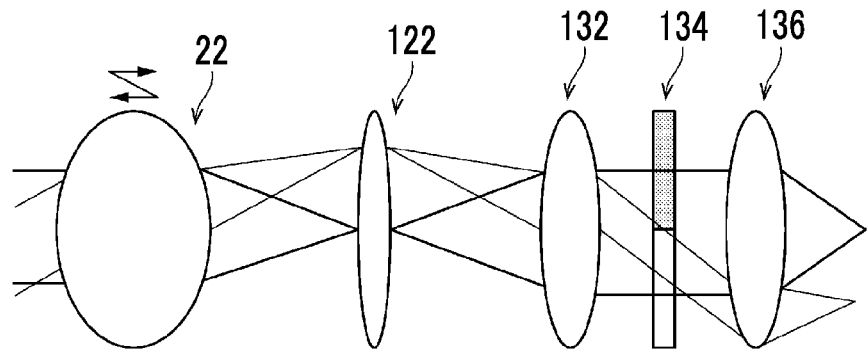
FIGS. 14A, 14B, 14C, and 14D are diagrams showing aspects of adjustment in Cases 1 to 4.
Figure 14B:
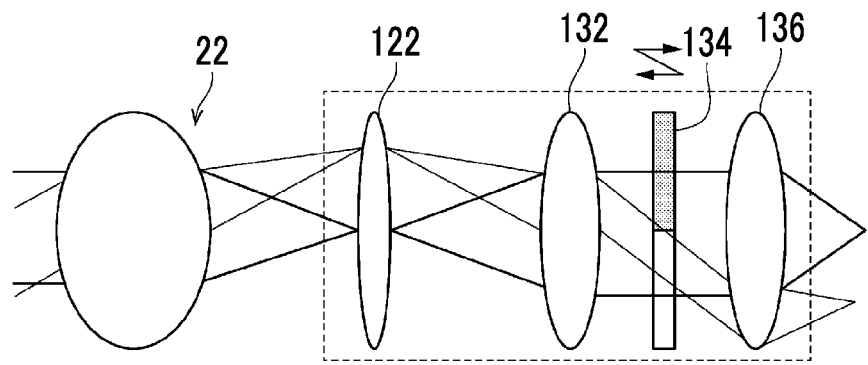
Figure 14C:
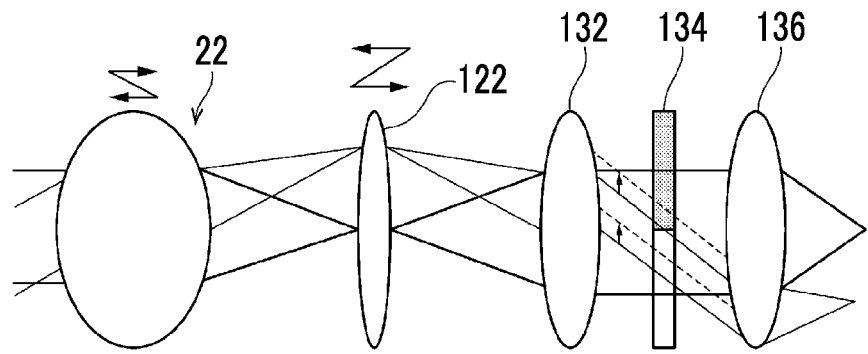
Figure 14D:
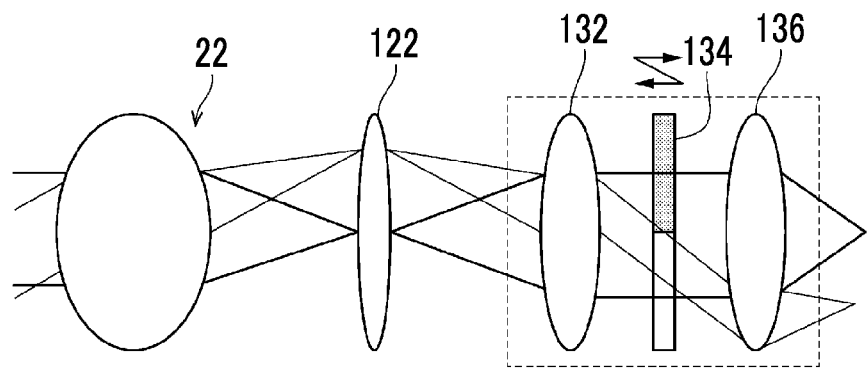

As shown in FIG. 1, the imaging device body 140 comprises a processor 142. As shown in FIG. 12, the processor 142 (a processor, a computer) includes the respective units (functions), such as an image acquisition unit 142A, a relative position detection unit 142B, an image support information generation unit 142C, and a display controller 142D, and performs the acquisition (including the removal of interference) of spectral images, the detection of the position of the field lens relative to another optical system and/or the multispectral camera, the generation and output of the image support information, and the like. Details of the processing of an adjustment method performed by the processor 142 will be described later.

The functions of the above-mentioned processor 142 can be realized using various processors. The various processors include, for example, a central processing unit (CPU) that is a general-purpose processor realizing various functions by executing software (program). Further, the various processors described above include a graphics processing unit (GPU) that is a processor specialized in image processing. Furthermore, the various processors described above also include a programmable logic device (PLD) that is a processor of which circuit configuration can be changed after manufacture, such as a field programmable gate array (FPGA). In addition, the various processors described above also include dedicated electrical circuitry that is a processor having circuit configuration dedicatedly designed to perform specific processing, such as an application specific integrated circuit (ASIC), and the like.

The respective functions of the processor 142 may be realized by one processor, or may be realized by a plurality of processors. Further, one processor may correspond to a plurality of functions. Furthermore, the respective functions of the processor 142 may be realized by a circuit, or a part of the respective functions may be realized by a circuit and the rest thereof may be realized by a processor.

In a case where the above-mentioned processor or the above-mentioned electrical circuitry executes software (program), processor (computer)-readable codes of the software to be executed or data required to execute the software are stored on a non-transitory recording medium, such as a flash memory 144, and the processor refers to the software or the data. The software stored on the non-transitory recording medium includes an adjustment program that is used to execute the adjustment method according to this embodiment. The codes or the data may be recorded on non-transitory recording mediums using various magneto-optical recording devices, semiconductor memories, or the like instead of the flash memory 144. Here, "semiconductor memories" include a read only memory (ROM) and an electronically erasable and programmable ROM (EEPROM) in addition to a flash memory. For example, a RAM 146 is used as a transitory storage region during processing using software.

<Specific Aspect of Adjustment of Conjugate Relationship>
<Adjustment Based on Position of Field Lens>

In the imaging system 10 (imaging device 100) according to the first embodiment, the processor 142 may detect the position of the field lens 122 (a position of the field lens 122 relative to the optical system 20 and the multispectral camera 130) and the like, and may generate and output information (image support information) required for the adjustment of a conjugate relationship on the basis of this position.

Figure 15:
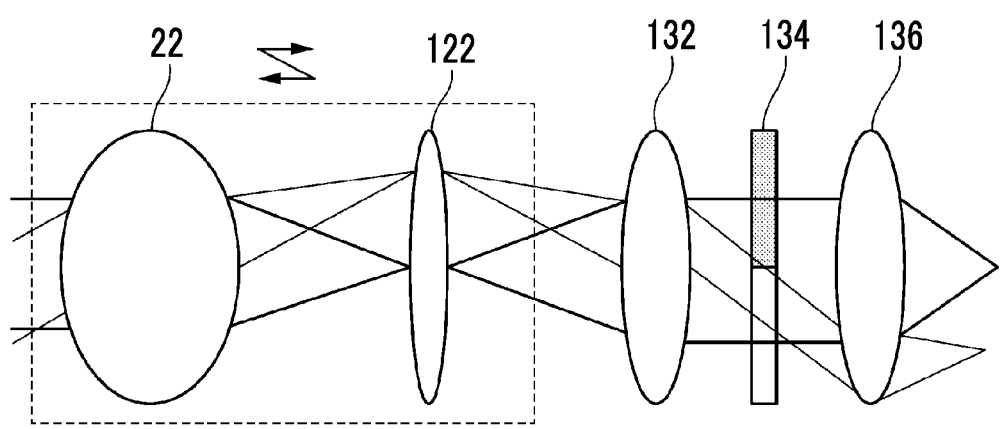
FIG. 15 is another diagram showing an aspect of adjustment in Case 5.

FIG. 13 is a table showing an example of a relationship between the relative position and the like of the field lens and elements to be adjusted. Further, FIGS. 14A, 14B, 14C, and 14D are diagrams showing aspects of adjustment in Cases 1 to 4, and FIG. 15 is a diagram showing an aspect of adjustment in Case 5. As shown in FIGS. 14A, 14B, 14C, and 14D and FIG. 15, a plurality of elements may be integrally moved. In this way, which element should be adjusted differs depending on a situation, such as the relative position.

The relative position detection unit 142B (the processor 142: see FIG. 12) can detect the positions of the field lens 122, the lenses (the first lens 132 and the second lens 136) of the multispectral camera 130, and the wavelength polarizing filter unit 134 by a photo interrupter, a magneto resistive sensor (MR sensor), or the like.

<Procedure of Adjustment of Conjugate Relationship>

Figure 16:
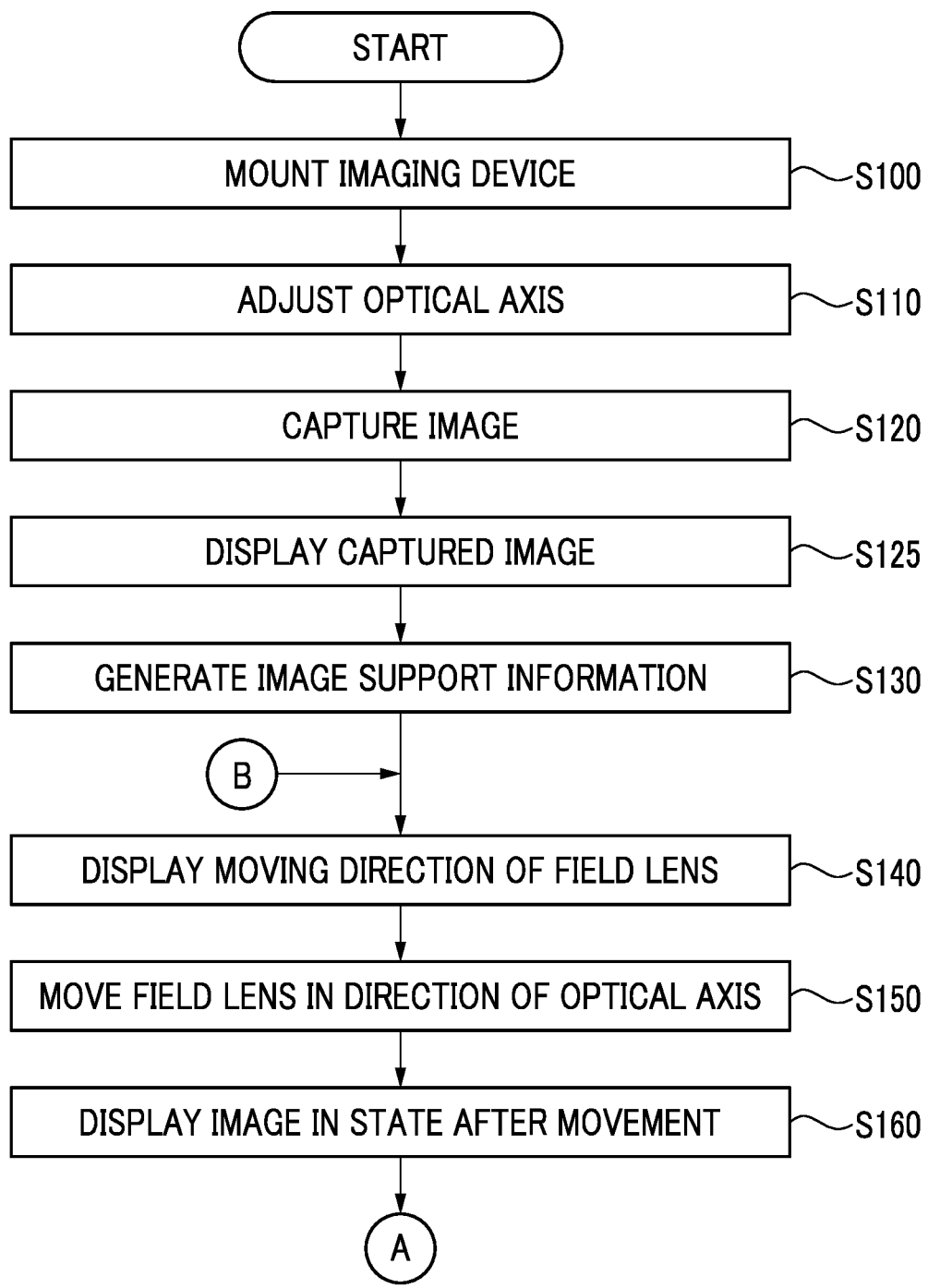
FIG. 16 is a flowchart (1/2) showing a procedure for the adjustment of a conjugate relationship.
Figure 17:
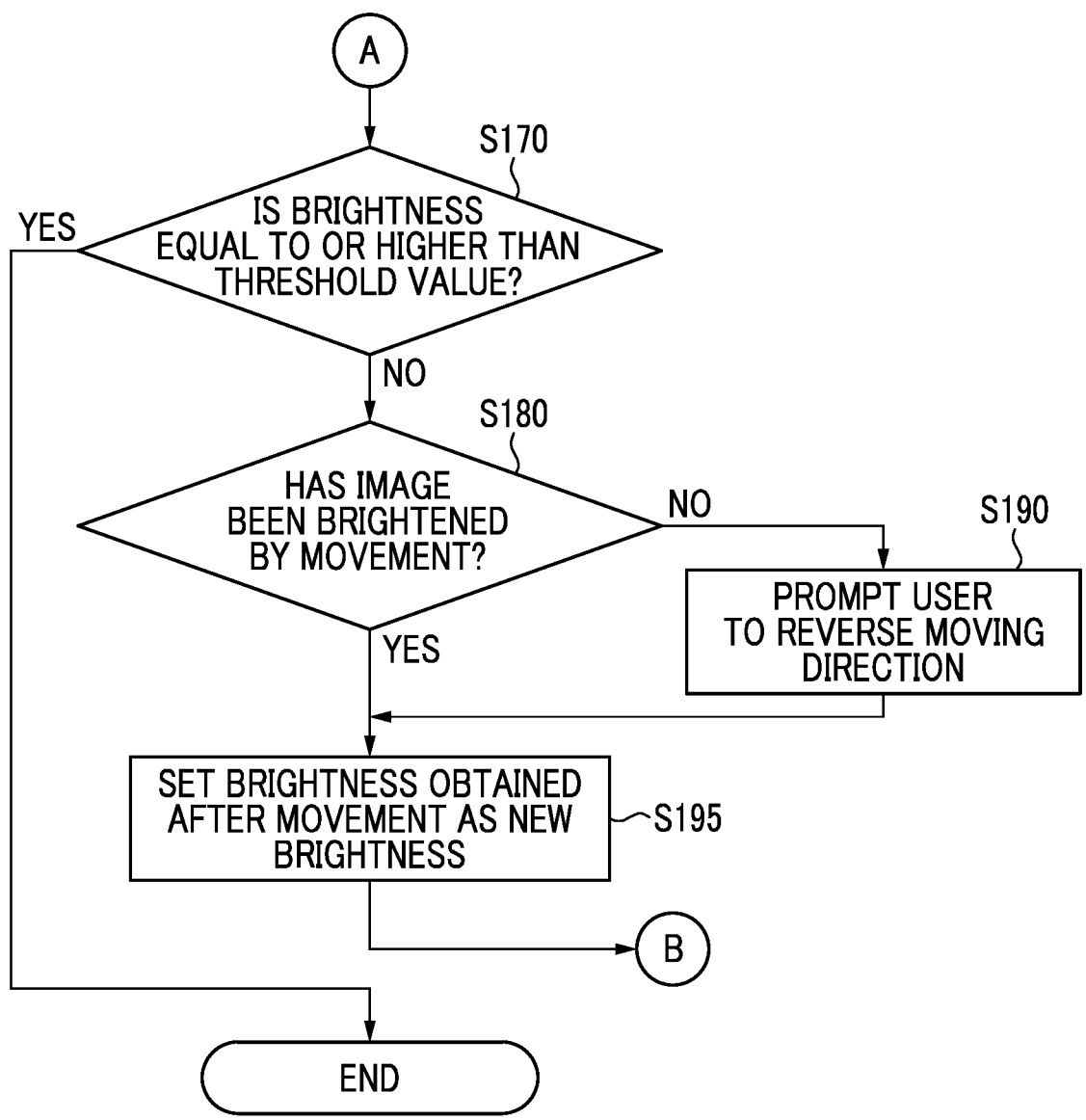
FIG. 17 is a flowchart (2/2) showing a procedure for the adjustment of a conjugate relationship.

FIGS. 16 and 17 are flowcharts showing a procedure of the adjustment of a conjugate relationship. A case where a conjugate relationship is adjusted mainly using the movement of the field lens 122 is shown in these flowcharts. These flowcharts will be described including both processing performed by the processor and an adjustment made by a user.

<Generation of Spectral Image>

A user mounts the field lens unit 120 and the multispectral camera 130 on an image side of the optical system 20 (another optical system) (Step S100), and adjusts the optical axes of the optical system 20, the field lens unit 120, and the multispectral camera 130. In a case where the user gives an instruction to perform imaging via the operation unit 320 or the like in this state, the image acquisition unit 142A (processor 142) generates a plurality of images (spectral images), which correspond to the wavelength ranges of the optical filters 138A to 138D (a plurality of optical filters), respectively, on the basis of a plurality of image signals output from the imaging element 138 (Step S120: imaging step).

<Removal of Interference in Spectral Images>

In order to obtain the images corresponding to the wavelength ranges of the optical filters 138A to 138D, it is necessary to separate and extract pixel signals, which correspond to the respective wavelength ranges, from the respective pixels of the imaging element 138. However, interference (crosstalk) occurs in these image data. That is, since lights having the respective wavelength ranges are incident on the respective pixels, an image to be generated is an image in which images corresponding to the plurality of wavelength ranges are mixed. For this reason, the image acquisition unit 142A (processor) performs interference removal processing to generate image data corresponding to the respective wavelength ranges. Here, in a case where any one (for example, the aperture region 135D) of the aperture regions 135A to 135D is shielded, three aperture regions 135A to 135C are used (that is, images corresponding to three wavelength ranges $\lambda 1$ to $\lambda 3$ are acquired).

Ratios (interference ratios) at which lights having the respective wavelength ranges $\lambda 1$ to $\lambda 3$ and emitted from the imaging device 100 are received by the respective pixels can be uniquely determined from the setting of the wavelength ranges $\lambda 1$ to $\lambda 3$ of lights transmitted by the optical filters 138A to 138C, the setting of the polarization directions of lights transmitted by the polarizing filters 139A to 139C, and the setting of the polarization directions (four directions) of lights received by the respective pixels of the imaging element 138; and can be obtained in advance. The image acquisition unit 142A can calculate the interference ratios from a plurality of images, which are acquired in a state where any one of a plurality of shielding members is inserted into the lens barrel 121, using the plurality of shielding members that shield specific aperture regions other than a specific aperture region among a plurality of aperture regions. The image acquisition unit 142A calculates coefficient groups (the respective elements of an interference removal matrix) for interference removal processing from these images, and stores these coefficient groups in the flash memory 144.

The image acquisition unit 142A calculates pixel signals corresponding to the respective wavelength ranges $\lambda 1$ to $\lambda 3$ from pixel signals obtained from the respective pixels, and generates images corresponding to the respective wavelength ranges $\lambda 1$ to $\lambda 3$ (images from which interference has been removed, spectral images) using the coefficient groups acquired from the flash memory 144. The images corresponding to the respective wavelength ranges $\lambda 1$ to $\lambda 3$ are output to the outside and stored in the storage device (not shown) as necessary. Further, the display controller 142D (processor) displays the spectral images on the display device 300 (display device) (Step S125: imaging step). The display of the spectral images and the adjustment of a conjugate relationship based on the light and darkness information of the spectral images may be performed for all wavelength ranges, or may be performed for some wavelength ranges.

<Generation and Output of Image Support Information>

The image support information generation unit 142C (processor) generates information (image support information) required for the adjustment of a conjugate relationship on the basis of the light and darkness information (light amount distribution) of at least one spectral image obtained from the multispectral camera 130 (Step S130: generation step). The image support information may include, for example, at least one of the attachment and detachment or exchange of the mount adapter 110 between the optical system 20 (another optical system) and the multispectral camera 130, the exchange of the field lens unit 120 and/or the multispectral camera 130, the forward or backward moving direction of the field lens 122, the forward or backward moving direction of the first lens 132 and/or the second lens 136, the forward or backward moving direction of the wavelength polarizing filter unit 134, and the exchange of the wavelength polarizing filter unit 134 (alternatively, the exchange of the optical filters 138A to 138D).

The image support information generation unit 142C can generate the above-mentioned image support information on the basis of a direction of the aperture region and the light and darkness information of the spectral image. Specifically, as described above with reference to FIGS. 8A, 8B, 8C, 8D, 8E, 8F, and the like, the image support information can be generated using the fact that the centroids of the aperture regions 135A to 135D are different from the centroid 135G of all the aperture regions.

<Relationship Between the Direction of Aperture Region and Light and Darkness Information of Spectral Image>

Figure 18A:
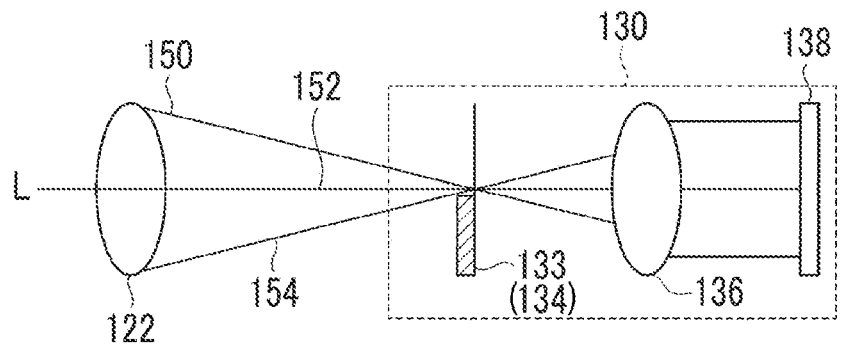
FIGS. 18A, 18B, and 18C are conceptual diagrams showing a relationship between a direction of an aperture region and the light and darkness information of a spectral image.
Figure 18B:
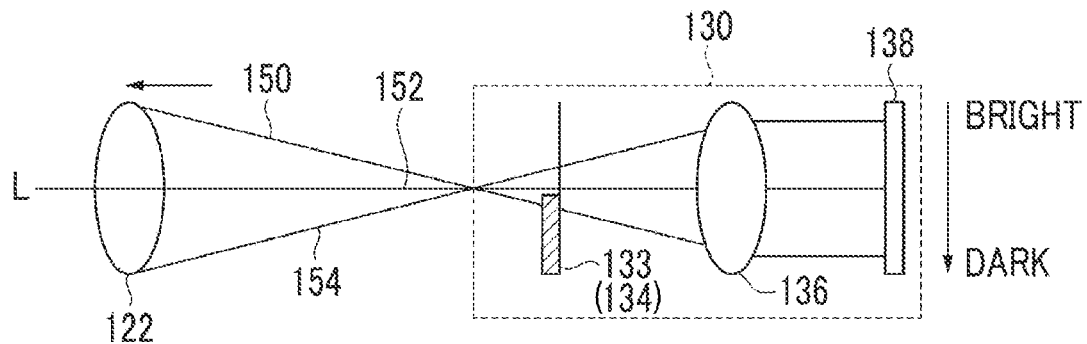
Figure 18C:
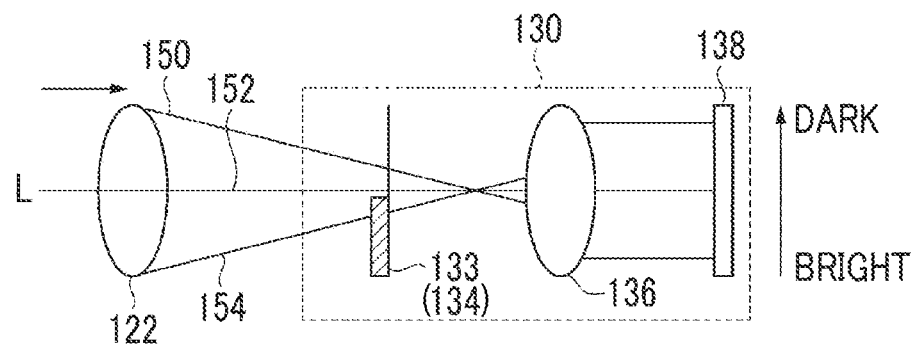

FIGS. 18A, 18B, and 18C are conceptual diagrams showing a relationship between the direction of the aperture region and the light and darkness information of the spectral image. As shown in FIGS. 18A, 18B, and 18C, in a case where attention is paid to a specific wavelength range, the optical filters (in this case, the optical filters 138B to 138D disposed in the aperture regions 135B to 135D), which are disposed in the aperture regions other than the aperture region (for example, the aperture region 135A) corresponding to the wavelength range, block (at least a part of) lights having the wavelength ranges other than the "specific wavelength range". Accordingly, the optical filters act like stops for a light having "specific wavelength range" in the multispectral camera 130. For convenience of description, the first lens 132 is not shown in FIGS. 18A, 18B, and 18C. An image 133 is an image of the wavelength polarizing filter unit 134 that is formed by the first lens 132 (an incident pupil of the multispectral camera 130).

FIG. 18A shows a state where rays (an upper ray 150, a main ray 152, and a lower ray 154) transmitted through the field lens 122 are not blocked by "stop" for such a specific wavelength range (a short thick line in FIG. 18A; indicated by 134 that is a reference numeral of the wavelength polarizing filter unit) (vignetting does not occur). In this state, light and darkness distribution is not generated on a light-receiving surface of the imaging element 138. On the other hand, in a state shown in FIG. 18B (a state where the field lens 122 is closer to a subject side than in the state shown in FIG. 18A), the main ray 152 and the lower ray 154 are not blocked but the upper ray 150 is blocked by "stop". As a result, an upper side in FIG. 18B is bright and a lower side in FIG. 18B is dark (the occurrence of dimming at a peripheral portion). Further, in a state shown in FIG. 18C (a state where the field lens 122 is closer to an image side than in the state shown in FIG. 18A), the upper ray 150 and the main ray 152 are not blocked but the lower ray 154 is blocked by "stop". As a result, a lower side in FIG. 18C is bright and an upper side in FIG. 18C is dark (the occurrence of dimming at a peripheral portion).

In the imaging device according to the embodiment of the present invention, the image support information can be generated in consideration of a relationship between the direction of such an aperture region and the light and darkness information of the spectral image. For example, since it is considered that a case where an upper side in the spectral image is bright and a lower side in the spectral image is dark is the state shown in FIG. 18B, it is possible to adjust the conjugate relationship of a pupil to make the light amount distribution of the spectral image close to a uniform state by lowering the field lens 122 to the rear side (image side) to make a state close to the state shown in FIG. 18A.

The display controller 142D (processor) displays (outputs) the image support information (in the above-mentioned example, the moving direction of the field lens 122), which is generated in this way, on the display device 300 (Step S140: output step). For example, the display controller 142D (processor) can display (output) a message "Please lower the field lens to the rear side" (a message showing the direction of the field lens 122) on the display device 300 in the above-mentioned example. The display controller 142D may display (output) the moving direction (a forward movement or alternation) with a symbol, such as an arrow, instead of or in addition to displaying such a message (image support information) with letters. Further, the display controller 142D may display (output) an adjustment procedure serving as the image support information. The display device 300 displays at least one of the image support information or an adjustment procedure serving as the image support information according to an output from the display controller 142D. A user can lower the field lens 122 to the rear side (move the field lens 122 backward in the direction of the optical axis L) according to the image support information (Step S150). In a case where an adjustment (movement) is made, the image acquisition unit 142A and the display controller 142D (processor) display an image (spectral image), which is in a state after movement, on the display device 300 (Step S160: display step).

The image support information generation unit 142C (processor) determines whether or not the brightness of the image in a state after movement is equal to or higher than a threshold value (Step S170: brightness determination step and output step). In a case where a determination is positive (that is, in a case where the image is bright to have a brightness equal to or higher than the threshold value and vignetting is reduced), the processing ends. The image support information generation unit 142C can employ, for example, "the sum of luminance values of the entire screen in a case where the maximum luminance of an image is standardized as 1" or "the inverse number of a distance from the center of the screen to the position of the centroid of luminance values" as the definition of "brightness". The image support information generation unit 142C and the display controller 142D may display image support information, which indicates that the adjustment of a conjugate relationship ends, on the display device 300 in a case where the determination in Step S170 is positive and the processing ends.

In a case where the determination in Step S170 is negative, the image support information generation unit 142C determines whether or not the image is brightened by movement (Step S180: brightness determination step and output step). In a case where this determination is negative, the image support information generation unit 142C and the display controller 142D generate a message prompting a user to reverse the moving direction of the field lens 122 as the image support information and displays the message on the display device 300 (Step S190: generation step and output step). In Step S195, the image support information generation unit 142C sets brightness obtained after movement as new brightness (brightness determination step, generation step, and output step), and returns to Step S140. In the example shown in FIGS. 16 and 17, as described above, a conjugate relationship can be adjusted in the same manner as in a case where a focus lens is driven by "hill climbing method" in a general camera system.

According to the imaging system 10 (imaging device 100), the adjustment method, and the adjustment program according to the first embodiment, since a conjugate relationship can be adjusted in this way, multispectral images having good image quality can be acquired.

A case where the field lens 122 is moved has been described in the flowcharts shown in FIGS. 16 and 17. However, even in a case where other means (the attachment and detachment of the mount adapter, the attachment and detachment of the multispectral camera, the movement of the lens or the filter unit, or the like) is used as described above, a conjugate relationship can be adjusted in the same manner.

<Influence of Shapes of Aperture Regions on Adjustment of Conjugate Relationship>

FIG. 19 is a table showing an influence of the shapes of the aperture regions on the adjustment of a conjugate relationship. In FIG. 19, features related to the movement of the field lens are summarized in the column of "parameters related to the movement of the field lens", features related to the attachment and detachment and exchange of the field lens are summarized in the column of "attachability/detachability", and basic features in a case where the field lens is used in combination are summarized in the column of "others". As shown in FIG. 19, an influence on the adjustment of a conjugate relationship varies depending on the shapes of the aperture regions. In the imaging device according to the embodiment of the present invention, such as the imaging device 100, the centroids of the plurality of aperture regions are different from each other (the respective aperture regions are arranged asymmetrically with respect to the centroid of all the aperture regions). For this reason, a reduction in the amount of light at a peripheral portion and the moving distance of the field lens is increased in this case as compared to a case where the centroids of the plurality of aperture regions coincide with each other (for example, a case where the plurality of aperture regions have concentric circular shapes). On the other hand, in a case where the centroids of the aperture regions are different from each other, it is easy to discriminate the moving direction of the field lens as in an example to be described later. Further, the attachment and detachment of the field lens or an applicable F-Number also depends on the shapes of the aperture regions.

<Relationship Between Degree of Reduction in Amount of Light and Element to be Adjusted>

The shapes of the aperture regions affect the adjustment of a conjugate relationship as described above, but the amount of reduction in the amount of light at a peripheral portion (the degree of vignetting) also affects the adjustment of a conjugate relationship. Specifically, in a case where a reduction in the amount of light at a peripheral portion is significant (vignetting is significant), it is necessary to roughly adjust a conjugate relationship (to significantly change a conjugate relationship). Accordingly, it is preferable that field lenses and/or multispectral cameras are attached and detached (field lenses and/or multispectral cameras having different sizes, focal lengths, or the like are mounted). On the other hand, in a case where a reduction in the amount of light at a peripheral portion is not significant (vignetting is not significant), it is necessary to finely adjust a conjugate relationship (to adjust a conjugate relationship with minute displacement). Accordingly, it is preferable that a field lens and/or a multispectral camera is moved. The image support information generation unit 142C and the display controller 142D (processor) can generate and display image support information in consideration of such circumstances.

<Specific Example of Adjustment of a Conjugate Relationship in Which Shapes of Aperture Regions are Considered>

FIGS. 20A, 20B1, 20B2, 20B3, 20B4, 20C1, 20C2, 20C3, and 20C4 are diagrams showing specific examples of the adjustment of a conjugate relationship in which the shapes of aperture regions are considered (a case where the field lens 122 is moved). As shown in FIG. 20A, aperture regions 160A to 160D (a plurality of aperture regions; forming an aperture region 160 as a whole) have a fan shape, and centroids of the respective aperture regions 160A to 160D are different from each other. In a case where attention is paid to the aperture region 160B as shown in FIG. 20B1 in this situation, each of the other aperture regions 160A, 160C, and 160D acts as a kind of "stop" or "shielding member" as described above (it is assumed that optical filters having at least a part of wavelength ranges different from each other are mounted in the respective aperture regions).

In this case, in a spectral image generated by the aperture region 160B, a left side is bright on the contrary to the direction of an aperture of the aperture region 160B (a right side is open) as shown in FIG. 20B2 (see FIGS. 18A, 18B, and 18C). Accordingly, in this case, the image support information generation unit 142C and the display controller 142D (processor) generate information (image support information) prompting a user to increase a distance between the field lens 122 and the multispectral camera 130 (to move the field lens 122 forward) (generation step and output step), and display the information on the display device 300 (output step). FIG. 20B3 shows an example of a spectral image in a state where a user has moved the field lens 122 on the basis of the image support information, but a dark region still remains on the right side in the image in this example. Accordingly, the image support information generation unit 142C and the display controller 142D generate information prompting a user to increase a distance between the field lens 122 and the multispectral camera 130 again, and display the information on the display device 300. FIG. 20B4 shows an example of a spectral image in a state where a user has moved the field lens again. Since a brightness is equal to or higher than a threshold value and light and darkness distribution is reduced, the processing ends.

FIG. 20C1 is a diagram showing the aperture region 160D of which the left side is open, and a right side in a spectral image is bright as shown in FIG. 20C2 in this case. Accordingly, the image support information generation unit 142C and the display controller 142D generate information (image support information) prompting a user to increase a distance between the field lens 122 and the multispectral camera 130 as in FIGS. 20B2 to 20B4 even in this case (generation step and output step), and display the information on the display device 300 (output step). As a result, in a case where a brightness is equal to or higher than a threshold value and light and darkness distribution is reduced as shown in FIG. 20C4, the processing ends.

According to the imaging device (the imaging device 100, the imaging system 10), the adjustment method, and the adjustment program according to the first embodiment, multispectral images having good image quality can be acquired as described above.

<Examples of Connection to Another Optical System>

Figure 21:
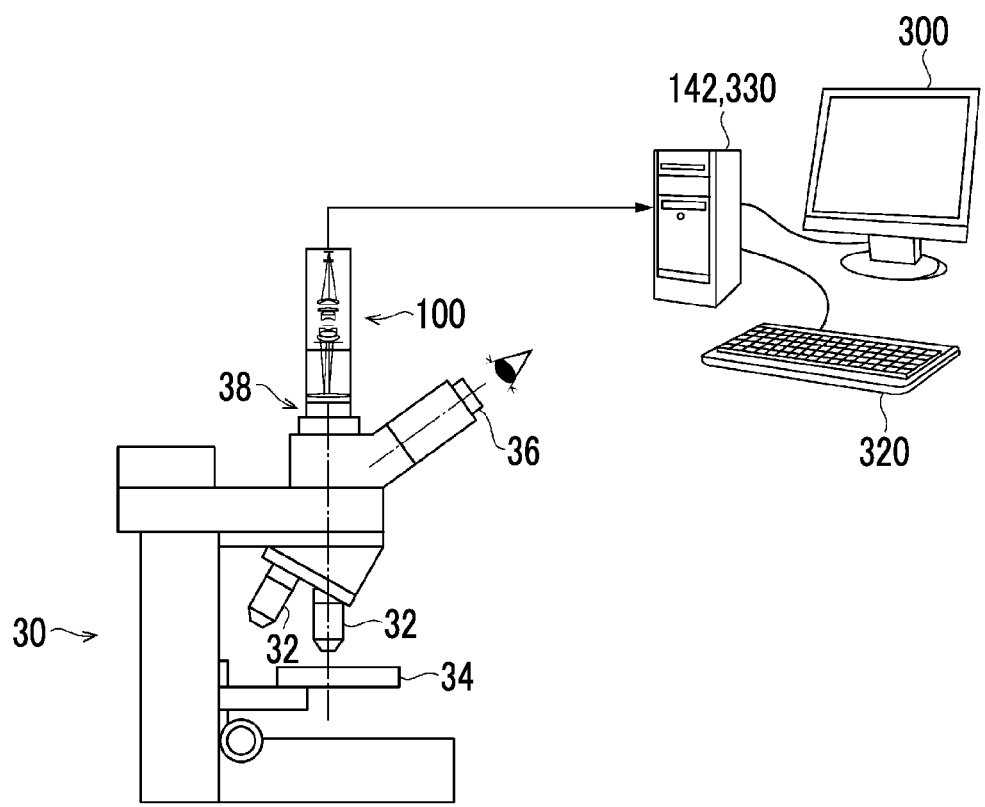
FIG. 21 is a diagram showing an aspect of connection to a microscope.

The imaging device according to the embodiment of the present invention can be combined with various optical systems. Accordingly, multispectral imaging can be performed even by an optical system, which cannot perform multispectral imaging by itself. FIG. 21 is a diagram showing an aspect of connection to a microscope 30 (an aspect of "another optical system"). The microscope 30 comprises an optical system including an objective lens 32, and a user can observe a specimen or the like placed on a stage 34 via an eyepiece portion 36. The microscope 30 is provided with a camera-connecting part 38, and the imaging device 100 (an aspect of the imaging device according to the embodiment of the present invention) can be connected to the camera-connecting part 38. A part of luminous flux from the specimen or the like is guided to the imaging device 100 through the camera-connecting part 38, and a conjugate relationship of a pupil is adjusted by the imaging device 100 as described above in the first embodiment, so that multispectral images having good image quality can be acquired. The processing of the adjustment method is performed by the processor 142 and a computer 330 (processor), and an acquired image can be displayed on the display device 300. A user can perform operations required for the processing via the operation unit 320. The above-mentioned imaging device body 140 (processor 142) may be connected to the microscope 30, or may be formed integrally with the computer 330 as shown in FIG. 21.

Figure 22:
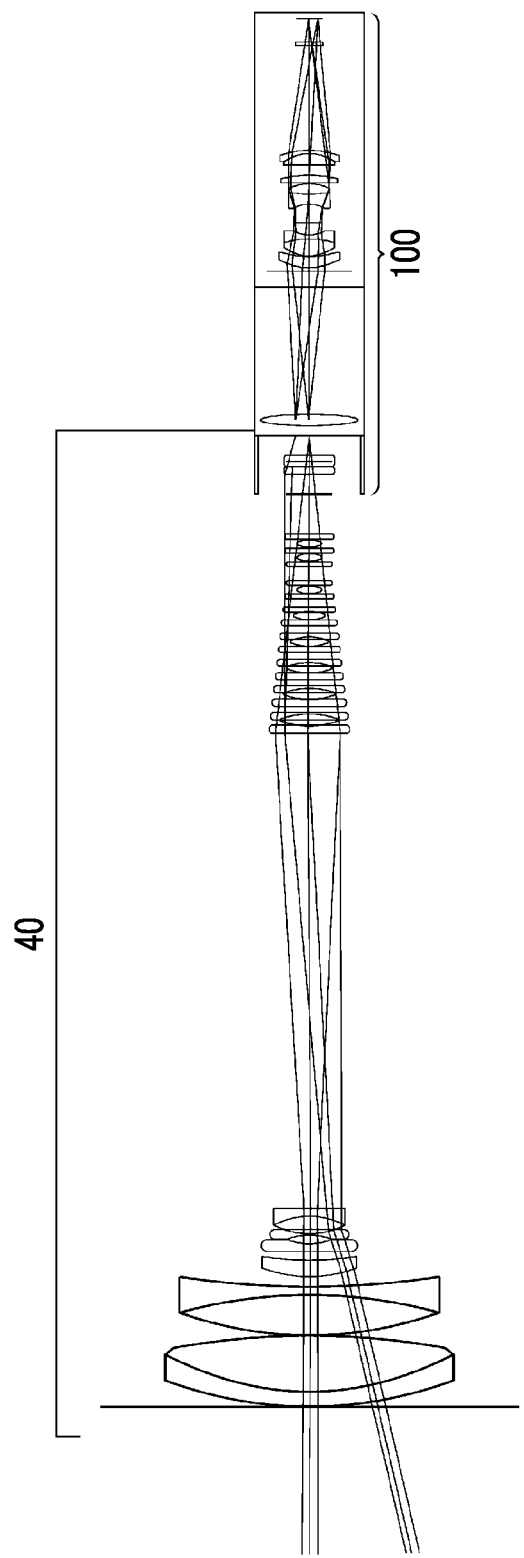
FIG. 22 is a diagram showing an aspect of connection to a zooming optical system.

FIG. 22 is a diagram showing an aspect of connection to a zooming optical system. Even in this case, a conjugate relationship of a pupil is adjusted by the imaging device 100 in the same manner as the first embodiment or the aspect of FIG. 21, so that multispectral images having good image quality can be acquired.

<Another Aspect of Wavelength Polarizing Filter Unit and Imaging Element>

In the first embodiment, the polarizing filters 139A to 139D provided in the wavelength polarizing filter unit 134 and the polarizing filter elements 214A to 214D provided in the imaging element 138 receive light having passed through any of the aperture regions. However, the present invention is not limited to such an aspect. In an imaging device using a pupil split type multispectral camera, a conjugate relationship can be adjusted using the movement or the like of the field lens even without using polarization. As a result, multispectral image having good image quality can be acquired.

<Aspect in Which Another Optical System and Imaging Device Are Not Connected to Each Other>

In the above-mentioned aspect, "another optical system" and the imaging device (imaging device 100) according to the embodiment of the present invention are connected to each other via the mount adapter 110 (adjustment mechanism) or the like and the respective elements are connected to each other even in the imaging device 100. However, these elements do not necessarily need to be mechanically connected to each other in the present invention. For example, an optical system 20 (another optical system) and an imaging device 101 (imaging device) can be disposed apart from each other as in an imaging system 11 shown in FIG. 23, and a field lens unit 120 and a multispectral camera 130 can be disposed apart from each other even in the imaging device 101. For example, it is conceivable that each of the optical system 20, the field lens unit 120, and the multispectral camera 130 is held by a member (not shown), such as a tripod or a guide rail, or is placed on an adjustment table.

Further, even in such an aspect, the adjustment of an interval between the respective element and the forward or backward movement, the attachment and detachment, the exchange, and the like of the lenses (the field lens 122, the first lens 132, and the second lens 136) can be performed as in the above-mentioned aspect. Accordingly, a conjugate relationship of a pupil can be adjusted, so that multispectral images having good image quality can be acquired. Even in the aspect shown in FIG. 23, it is preferable that the optical axes of the respective elements coincide with each other before the capturing of multispectral images as described above in the first embodiment.

The embodiment and other aspects of the present invention have been described above, but the present invention is not limited to the above-mentioned aspects and can have various modifications without departing from the scope of the present invention.

EXPLANATION OF REFERENCES

10: imaging system
11: imaging system
20: optical system
22: lens
30: microscope
32: objective lens
34: stage
36: eyepiece portion
38: camera-connecting part
100: imaging device
101: imaging device
104: first lever
106: second lever
108: slit
110: mount adapter
110A: mount adapter
110B: mount adapter
120: field lens unit
120A: field lens unit
120B: field lens unit
121: lens barrel
122: field lens
122A: field lens
122B: field lens
124A: lens barrel
124B: lens barrel
126A: slit
126B: slit
127: arm
128: lens unit
130: multispectral camera
130A: multispectral camera
130B: multispectral camera
131: lens barrel
132: first lens
133: image
134: wavelength polarizing filter unit
135: frame
135A: aperture region
135B: aperture region
135C: aperture region
135D: aperture region 135G: centroid
136: second lens
137A: filter set
137B: filter set
137C: filter set
137D: filter set
138: imaging element
138A: optical filter
138B: optical filter
138C: optical filter
138D: optical filter
139A: polarizing filter
139B: polarizing filter
139C: polarizing filter
139D: polarizing filter
140: imaging device body
142: processor
142A: image acquisition unit
142B: relative position detection unit
142C: image support information generation unit
142D: display controller
144: flash memory
146: RAM
150: upper ray
152: main ray
154: lower ray
160: aperture region
160A: aperture region
160B: aperture region
160C: aperture region
160D: aperture region
211: pixel array layer
212: photodiode
213: polarizing filter element-array layer
214A: polarizing filter element
214B: polarizing filter element
214C: polarizing filter element
214D: polarizing filter element
215: microlens array layer
216: microlens
300: display device
310: storage device
320: operation unit
330: computer
L: optical axis
S100 to S195: respective steps of procedure of adjustment of conjugate relationship
λ1: wavelength range
λ2: wavelength range
λ3: wavelength range

What is claimed is:

1. An imaging device that is disposed on an image side of another optical system, the imaging device comprising:
a multispectral camera that acquires images in a plurality of wavelength ranges;
a field lens that relays the other optical system to the multispectral camera; and
an adjustment mechanism that adjusts a conjugate relationship between an emission pupil position of the other optical system and an incident pupil position of the multispectral camera, based on light and darkness information of the images,
wherein the multispectral camera includes
a wavelength polarizing filter unit including
a frame which is disposed at a pupil position or near the pupil position and includes a plurality of aperture regions and in which centroids of the plurality of aperture regions are different from each other,
a plurality of optical filters that are arranged in the plurality of aperture regions and include two or more optical filters transmitting lights having at least a part of wavelength ranges different from each other, and
a plurality of polarizing filters that are arranged in the plurality of aperture regions and have different polarization directions,
an imaging element that includes a plurality of pixel groups receiving light transmitted through any of the plurality of aperture regions, and
a processor that generates an image on the basis of a plurality of image signals output from the imaging element.

2. The imaging device according to claim 1,
wherein the adjustment mechanism adjusts a distance between the other optical system and the field lens.

3. The imaging device according to claim 1,
wherein the adjustment mechanism adjusts a distance between the field lens and the multispectral camera.

4. The imaging device according to claim 1,
wherein the adjustment mechanism adjusts a distance between the emission pupil position of the other optical system and the field lens and a distance between the field lens and the incident pupil position of the multispectral camera.

5. The imaging device according to claim 1,
wherein the adjustment mechanism keeps an image magnification constant to make the adjustment.

6. The imaging device according to claim 5,
wherein the adjustment mechanism changes a position of the wavelength polarizing filter unit and/or a focal length of the field lens to keep the image magnification constant.

7. The imaging device according to claim 1,
wherein the adjustment mechanism is an attachment and detachment mechanism for the wavelength polarizing filter unit.

8. The imaging device according to claim 1,
wherein the processor outputs image support information required for the adjustment.

9. The imaging device according to claim 8,
wherein the processor outputs the image support information based on light and darkness information of at least one spectral image obtained from the multispectral camera.

10. The imaging device according to claim 9,
wherein the processor outputs a procedure of the adjustment serving as the image support information on the basis of a direction of the aperture region and the light and darkness information.

11. The imaging device according to claim 8, further comprising:
a display device,
wherein the display device displays at least one of the image support information output from the processor or a procedure of the adjustment serving as the image support information.

12. An adjustment method for an imaging device that is disposed on an image side of another optical system,
the imaging device including
a multispectral camera that includes a frame, a plurality of optical filters, and a plurality of polarizing filters and acquires images in a plurality of wavelength ranges, the frame disposed at a pupil position or near the pupil position and including a plurality of aperture regions, centroids of the plurality of aperture regions being different from each other, the plurality of optical filters being arranged in the plurality of aperture regions and including two or more optical filters transmitting lights having at least a part of wavelength ranges different from each other, and a plurality of polarizing filters being arranged in the plurality of aperture regions and having different polarization directions, a field lens that relays the other optical system to the multispectral camera, and an adjustment mechanism that adjusts a conjugate relationship between an emission pupil position of the other optical system and an incident pupil position of the multispectral camera, based on light and darkness information of the images, the adjustment method comprising:

an output step of outputting image support information required for the adjustment.

13. The adjustment method according to claim 12, wherein in the output step, the image support information based on light and darkness information of at least one spectral image obtained from the multispectral camera is displayed on a display device.

14. The adjustment method according to claim 13, wherein in the output step, a procedure of the adjustment serving as the image support information is displayed on the display device on the basis of a direction of the aperture region and the light and darkness information.

15. A non-transitory, computer readable tangible recording medium on which a program for causing, when read by a computer, the computer to execute the adjustment method according to claim 12 is recorded.

* * * * *